US012223729B2

(12) United States Patent
Barburescu et al.

(10) Patent No.: US 12,223,729 B2
(45) Date of Patent: Feb. 11, 2025

(54) SYSTEM AND METHOD FOR SURVEILLANCE OF GOODS

(71) Applicant: Everseen Limited, Cork (IE)

(72) Inventors: Calin Barburescu, Timis (RO); Robert Preda, Arad (RO); Alexandra Laicu, Timis (RO); Ana Cristina Todoran, Arad (RO); Paul Iusztin, Timis (RO); Marius Badea, Timis (RO); Laura Vasilie, Timis (RO); Alexandru Hulea, Buchare (RO); Qintilian-Emanuel Vintila, Timisoara (RO)

(73) Assignee: Everseen Limited, Blackpool (IE)

( * ) Notice: Subject to any disclaimer, the term of this patent is extended or adjusted under 35 U.S.C. 154(b) by 59 days.

(21) Appl. No.: 18/161,694

(22) Filed: Jan. 30, 2023

(65) Prior Publication Data

US 2023/0245460 A1    Aug. 3, 2023

Related U.S. Application Data

(60) Provisional application No. 63/305,933, filed on Feb. 2, 2022.

(51) Int. Cl.
*G06V 20/52* (2022.01)
*G06K 7/14* (2006.01)
(Continued)

(52) U.S. Cl.
CPC .......... *G06V 20/52* (2022.01); *G06K 7/1417* (2013.01); *G06Q 10/083* (2013.01);
(Continued)

(58) Field of Classification Search
CPC ...... G06V 20/52; G06V 10/764; G06V 20/44; G06V 2201/07; G06K 7/1417;
(Continued)

(56) References Cited

U.S. PATENT DOCUMENTS

2013/0188039 A1* 7/2013 Mishra ............ G06Q 10/08
    348/129
2017/0293883 A1* 10/2017 Li ................. G08B 15/00
(Continued)

OTHER PUBLICATIONS

C.-Y. Wang, et al., CSPNet: A New Backbone that can Enhance Learning Capability of CNN, 2020 IEEE/CVF Conference on Computer Vision and Pattern Recognition Workshops (CVPRW), 2020, pp. 1571-1580.

(Continued)

*Primary Examiner* — Michael Lee
(74) *Attorney, Agent, or Firm* — Young Basile Hanlon & MacFarlane, P.C.

(57) ABSTRACT

An order checking system includes video sensors configured to capture video footage of a monitored area located in proximity to a receipt/dispatch portal. A processing unit performs event analysis on the captured video footage, detects an entity and from a door opening event, an incoming delivery from a third-party supplier, identifies the third-party supplier and implements a check-in process for delivery persons associated therewith, detects an ingress/egress of merchandise through the receipt/dispatch portal and validates that detected delivered products matches with data regarding products that the third-party supplier should be delivering. A database stores at least a dataset of face images/logos for detecting faces/brands and a dataset of product images for identification of products. The database records an outcome of an order checking process and a check out of a delivery person at an end of a delivery.

11 Claims, 14 Drawing Sheets

(51) Int. Cl.
*G06Q 10/083* (2024.01)
*G06Q 10/087* (2023.01)
*G06T 7/20* (2017.01)
*G06V 10/764* (2022.01)
*G06V 20/40* (2022.01)

(52) U.S. Cl.
CPC ............. *G06Q 10/087* (2013.01); *G06T 7/20* (2013.01); *G06V 10/764* (2022.01); *G06V 20/44* (2022.01); *G06T 2207/30196* (2013.01); *G06T 2207/30242* (2013.01); *G06V 2201/07* (2022.01)

(58) Field of Classification Search
CPC .... G06Q 10/083; G06Q 10/087; G06Q 10/08; G06T 7/20; G06T 2207/30196; G06T 2207/30242
See application file for complete search history.

(56) References Cited

U.S. PATENT DOCUMENTS

| | | | |
|---|---|---|---|
| 2017/0293885 A1* | 10/2017 | Grady | G06K 7/10009 |
| 2019/0122173 A1* | 4/2019 | Souder | G06V 10/82 |
| 2020/0231382 A1* | 7/2020 | O'Herlihy | G06Q 10/087 |
| 2021/0027240 A1* | 1/2021 | O'Herlihy | G06Q 10/08 |
| 2021/0031370 A1* | 2/2021 | Spurgeon | B25J 9/1669 |
| 2021/0233016 A1* | 7/2021 | O'Herlihy | G06Q 10/0833 |
| 2023/0161351 A1* | 5/2023 | Prasad | G06Q 10/087 701/28 |

OTHER PUBLICATIONS

S. Liu, et al., Path Aggregation for Instance Segmentation, 2018 IEEE/CVF Conference on Computer Vision and Pattern Recognition (CVPR), 2018, 8759-8768.

Wotjke N., et al., "Simple online and realtime tracking with a deep association metric" 2017 IEEE International Conference on Image Processing (ICIP), Beijing, 2017, pp. 3645-3649.

Porrello A., et al., "Robust Re-identification by Multiple View Knowledge Distillation, Computer Vision", ECCV 2020, Springer International Publishing, European Conference on Computer Vision, Glasgow, Aug. 2020.

Bewley A, et al., "Simple Online and Realtime Tracking", 2016 IEEE International Conference on Image Processing (ICIP), Phoenix, AZ, 2016, pp. 3464-3468.

Z Liu, et al., "Swin Transformer: Hierarchical Vision Transformer using Shifted Windows", Proceedings of the IEEE/CVF International Conference on Computer Vision (ICCV), 2021, pp. 10012-10022.

* cited by examiner

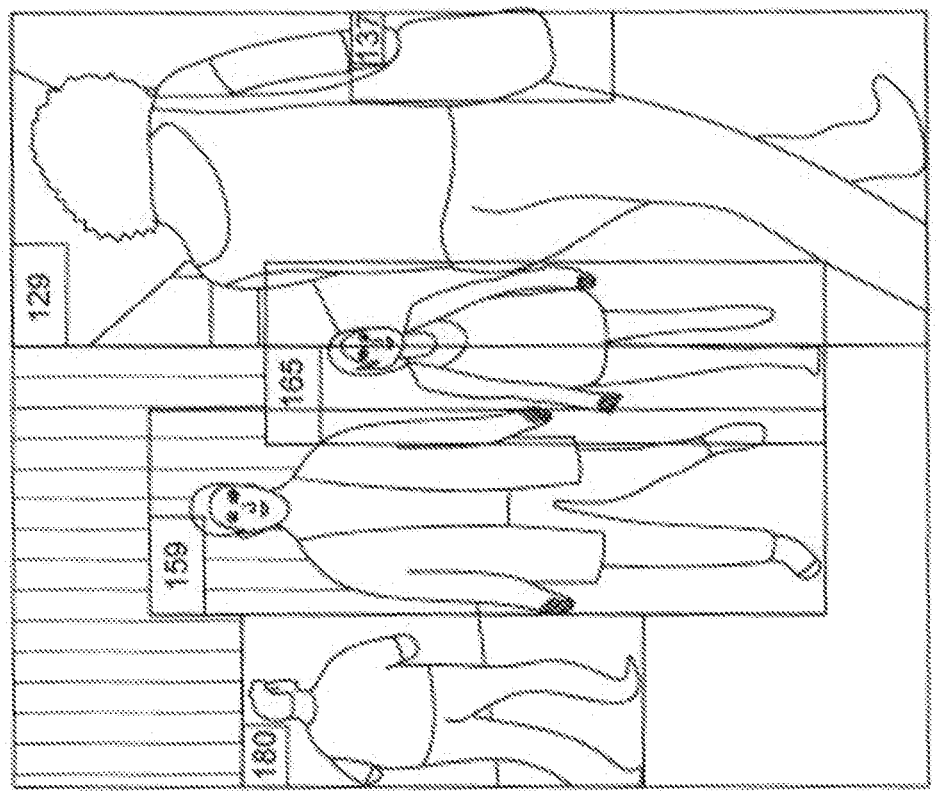
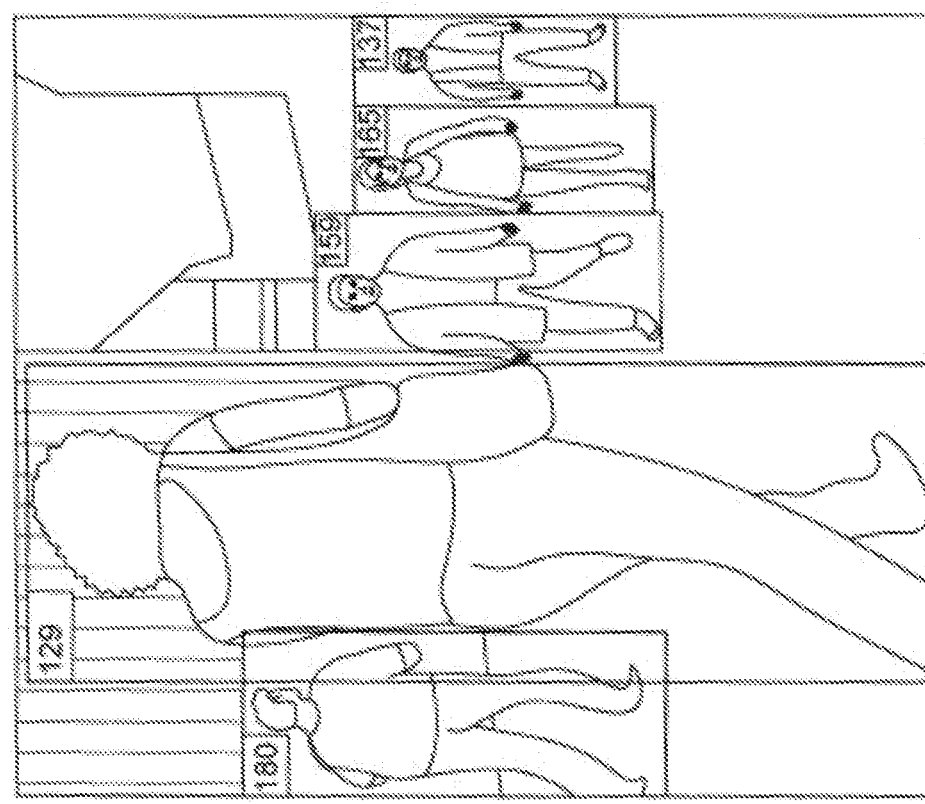
FIG. 8

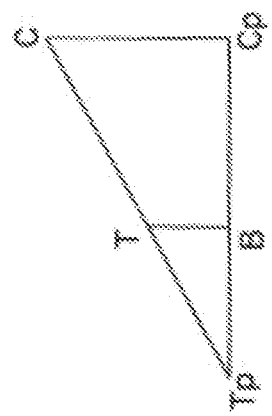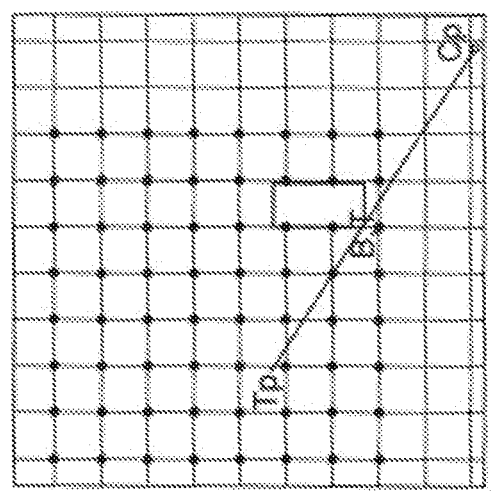
FIG. 13

SYSTEM AND METHOD FOR SURVEILLANCE OF GOODS

CROSS-REFERENCE TO RELATED APPLICATION(S)

This application claims priority to and the benefit of U.S. Provisional Patent Application Ser. No. 63/305,933, filed Feb. 2, 2022, the entire disclosure of which is hereby incorporated by reference.

TECHNICAL FIELD

The present disclosure relates generally to a system and method for surveillance. More particularly, the present disclosure relates to a system and method for surveillance of incoming/outcoming goods at a receipt/dispatch portal.

BACKGROUND

Environments such as retail environments having warehouses and the like may facilitate ingress/egress of persons and goods in addition to storing/retrieving goods. In many cases, high traffic of persons and goods through these environments may pose a challenge in tracking individual movements of persons and goods into and out of such environments, for example, to prevent entry of unauthorized persons, pilferage of goods, correct receipt/dispatch of goods, and the like. Traditionally, these efforts may have been carried out manually by deploying security personnel. However, when the traffic of such persons and goods is high, such manual effort by security personnel may be tedious and inconsistent. Hence, there is a need for a more robust system and method by which surveillance of persons and goods into and out of such environments can be carried out without the need for manual intervention.

SUMMARY

In one aspect of the present disclosure, there is provided an order checking system. The order checking system comprises a plurality of video sensors that are adapted to capture video footage of a monitored area located within an order receiving area or an order dispatch area of a receipt/dispatch portal. The order checking system further comprises a processing unit that is configured to perform event analysis on the captured video footage, detect an entity in the video footage captured by the video sensors, detect from a door opening event in the captured video footage, an incoming delivery from a third-party supplier, identify the third-party supplier and implement a check-in process for delivery persons from the third-party supplier, detect an ingress/egress of merchandise through the receipt/dispatch portal and validate that detected delivered products matches the data regarding products that the third-party supplier should be delivering. The order checking system also comprises a database communicably coupled to the processing unit. The database is configured to store at least a dataset of face images/logos for use in detecting faces/brands and a dataset of product images for use in identification of products. The database is also configured to record an outcome of an order checking process and a check-out of a delivery person at the end of a delivery for future retrieval upon request to the processing unit.

In another aspect of the present disclosure, there is provided a method for performing video surveillance. The method comprises capturing video footage, using a plurality of video sensors, of a monitored area located within an order receiving area or an order dispatch area of a receipt/dispatch portal. The method further comprises performing, using a processing unit, event analysis on the captured video footage. The method further comprises detecting, using the processing unit, an entity in the video footage captured by the video sensors. The method further comprises detecting from a door-opening event in the captured video footage, an incoming delivery from a third-party supplier using the processing unit. The method further comprises identifying, using the processing unit, the third-party supplier and implementing a check-in process for delivery persons from the third-party supplier. The method further comprises detecting, using the processing unit, an ingress/egress of merchandise through the receipt/dispatch portal and validating that detected delivered products matches the data regarding products that the third-party supplier should be delivering. The method further comprises storing, using a database, at least a dataset of face images/logos for use in detecting faces/brands and a dataset of product images for use in identification of products. The method further comprises recording an outcome, using the database of an order-checking process and a check-out of a delivery person at the end of a delivery. The method further comprises retrieving the recording, by the processing unit from the database, upon request to the processing unit.

In yet another aspect of the present disclosure, embodiments disclosed herein are also directed to a non-transitory computer readable medium having stored thereon computer-executable instructions which, when executed by a processing unit, causes the processing unit to perform the method disclosed herein.

This disclosure presents a system and method for surveillance of incoming/outcoming goods at receipt/dispatch portal. The present disclosure is described with reference to a retail environment. However, the skilled person will understand that the present disclosure is not restricted to use in a retail environment. On the contrary, the present disclosure is applicable to any environment in which goods pass through a dispatch portal, while leaving a first order fulfillment facility, and subsequently pass through a receipt portal, on entering a second order receiving facility, which is the required destination for the goods. Accordingly, the goal of the disclosed system is to detect inconsistencies between a planned inventory record of an incoming/outgoing order and the actual content of the corresponding received/pre-dispatch order.

Further, the system addresses the problem of detecting inaccurate or incomplete received orders and similarly inaccurate or incomplete assembled orders prior to dispatch. In this way, the goods traffic at both ends i.e., the dispatch and receipt portals of a delivery system can be characterized and controlled to improve both the accuracy of the delivery system and inventory management processes at both the order fulfillment facility and order receiving facility.

An incoming order of goods typically passes through an entry door of an order receiving facility prior to the order's receipt and acceptance by staff of the order receiving facility. Similarly, outgoing goods from an order fulfillment facility typically pass through an exit door of the order fulfillment facility prior to delivery to a required destination. For brevity, an entry door of an order receiving facility will be referred to henceforth as a receipt portal. Similarly, an exit door of an order fulfillment facility will be referred to henceforth as a dispatch portal. The present disclosure addresses the problem of loss prevention at receipt/dispatch portals. In particular, the present disclosure enables the automated checking of incoming/outgoing goods orders at receipt/dispatch portals.

In practice, an order receiving facility often includes a plurality of receipt portals. Similarly, an order fulfillment facility often includes a plurality of dispatch portals. Indeed, a given facility may undertake both order receipt and order fulfillment, in which case, the facility may include a first plurality of receipt portals and a second plurality of dispatch portals. The amount of time required to manually check an individual order and the large volume of incoming and/or outgoing order traffic typically experienced in an order receiving facility/order fulfillment facility, makes the manual surveillance of incoming and outgoing orders very challenging. The challenge is amplified in the event of several deliveries occurring simultaneously within the confined space of an order receiving area or an order dispatch area of the receipt/dispatch portal.

Accordingly, the present disclosure discloses a system and a method for automatic surveillance of incoming and outgoing traffic from either or both of a receipt portal and a dispatch portal of an order receiving facility and an order fulfillment facility respectively. For brevity, the system and method of the present disclosure will be referred to henceforth as the order checking system and the order checking method respectively.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

FIG. 8 illustrates an exemplary pair of consecutive video frames from a piece of video footage, in accordance with an embodiment of the present disclosure;

FIG. 11(*b*) is a virtual representation of points from FIG. 11(*a*) projected by a camera, in accordance with an embodiment of the present disclosure;

FIG. 12(*b*) is a virtual representation of projections $T_p$ and B corresponding to corner points T' and B' taken from the view of FIG. 12(*a*), in accordance with an embodiment of the present disclosure;

FIG. 13 is a virtual representation of an object seen by a camera disposed above the object, in accordance with an embodiment of the present disclosure;

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF ILLUSTRATIVE EMBODIMENTS

The following detailed description illustrates embodiments of the present disclosure and ways in which they can be implemented. Although the best mode of carrying out the present disclosure has been disclosed, those skilled in the art would recognize that other embodiments for carrying out or practicing the present disclosure are also possible.

Figure 1:
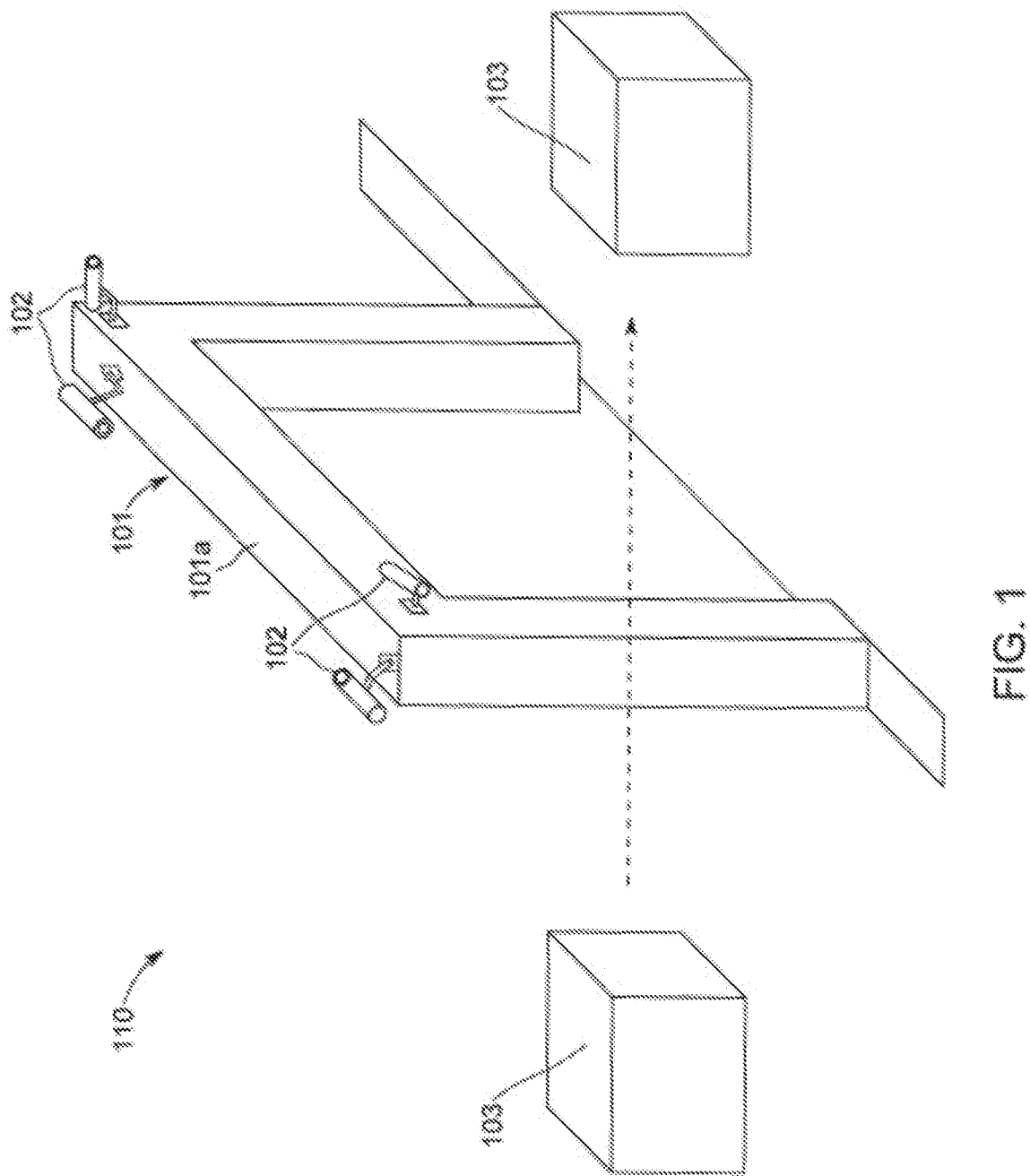
FIG. 1 is a perspective view of an exemplary environment in which an order checking system is implemented, in accordance with an embodiment of the present disclosure.
Figure 2:
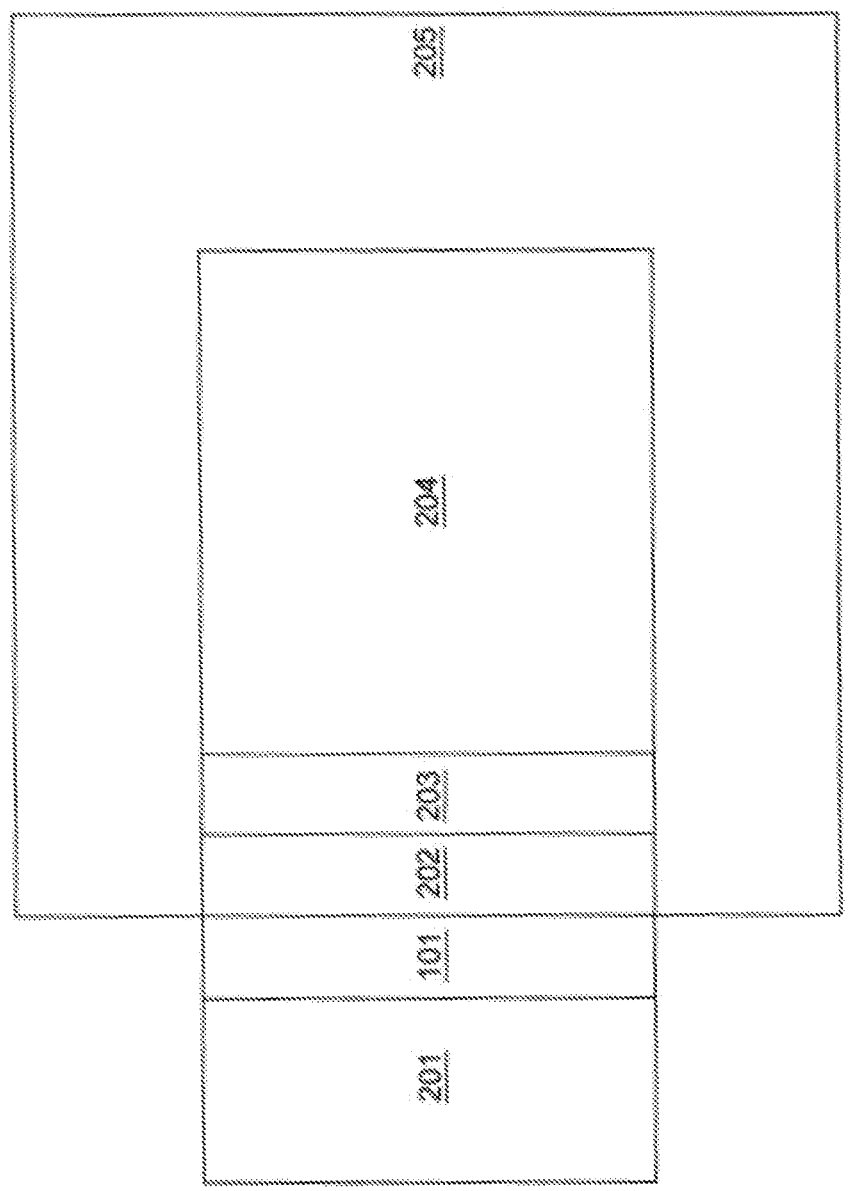
FIG. 2 is a diagrammatic top-down illustration of a monitored area in the illustrative environment of FIG. 1, wherein the monitored area is located proximally to a receipt/dispatch portal and is monitored by video sensors of the order checking system of FIG. 1.

Referring to FIGS. 1 and 2, an order checking system 110 comprises a plurality of video sensors 102 adapted to capture video footage of a monitored area located proximally to a receipt/dispatch portal 101. In one embodiment, the video sensors 102 may be mounted on a frame 101*a* of the receipt/dispatch portal 101. In another embodiment, the video sensors 102 may be disposed proximal to the receipt/dispatch portal 101 such that fields of views (FOVs) of the video sensors 102 include, at least, a monitored area having, either or both of a centre and sides of the receipt/dispatch portal 101 i.e., area adjoining the receipt/dispatch portal.

Accordingly, the monitored area is located within an order receiving area or an order dispatch area. The monitored area is formed from collective Fields of Views (FOVs) of the video sensors 102 and is delimited by the receipt/dispatch portal 101 and a Region of Interest (ROI) 204 (also known as a Pallet Analysis Zone). The monitored area also comprises a First Buffer Zone 202 and a Second Buffer Zone 203 which are used together as a hysteresis decision function, in embodiments of the present disclosure, to eliminate uncertainty in the determination of whether a moving entity is located outside, or inside, the corresponding order receiving area or order dispatch area.

In the illustrated example, an External Monitored Zone 201 located to a left of the receipt/dispatch portal 101 is deemed to be outside of the order receiving area or order dispatch area. Similarly, the area to a right of the receipt/dispatch portal 101 is deemed to be inside the order receiving area or order dispatch area. Thus, in this example, the presence of goods approaching an order receiving area can be detected in the External Monitored Zone 201. Furthermore, the goods are deemed to have traversed the receipt/dispatch portal 101, to enter the order receiving area or the order dispatch area, when the goods are detected in the First Buffer Zone 202 and immediately after i.e., in succession in the Second Buffer Zone 203. Similarly, goods are deemed to have exited the order receiving area or order dispatch area when the goods are detected in the Second Buffer Zone 203 and immediately after i.e., in succession in the First Buffer Zone 202.

A peripheral portion of the order receiving area or order dispatch area located near to the receipt/dispatch portal 101 is represented by an Internal Remaining Zone 205. The Internal Remaining Zone 205 does not lie within the Fields of View of the video sensors 102 of the order checking system 110. Similarly, using the naming protocol of the present example, the Internal Remaining Zone 205 is inside the order receiving area or order dispatch area. Accordingly, the Internal Remaining Zone 205 is an unmonitored area inside of the order receiving area or order dispatch area. Thus, the order checking system 110 of the present disclosure monitors movements of entities (persons, palettes) within the External Monitored Zone 201; First Buffer Zone 202 and Second Buffer Zone 203; and Region of Interest (ROI)/Pallet Analysis Zone 204 and accordingly, these aforementioned zones 201, 202, 203 and 204 together can be henceforth regarded as the monitored area for sake of brevity in this disclosure.

Referring to FIG. 2, in a top-down view of the monitored area, the Region of Interest (ROI)/Pallet Analysis Zone 204 and the first and second buffer zones 202 and 203 are defined as a set of rectangles. It will be understood by a person of ordinary skill that from a camera perspective view and corresponding to a setup presented in the view of FIG. 1, each of the Region of Interest (ROI)/Pallet Analysis Zone 204 and the first and second buffer zones 202 and 203 are shaped as a trapezium. Returning to the plan view of the monitored area shown in FIG. 2, a vertical dimension of the Region of Interest (ROI)/Pallet Analysis Zone 204 and of the first and second buffer zones 202 and 203 is equal to a vertical dimension of the receipt/dispatch portal 101. Similarly, the First Buffer Zone 202 and Second Buffer Zone 203 have a horizontal dimension equal to a horizontal dimension of the receipt/dispatch portal 101. In an example, the horizontal dimension of the Region of Interest (ROI)/Pallet Analysis Zone 204 is configured to be three times the horizontal dimension of a standard goods pallet. However, the person skilled in the art will acknowledge that the above-mentioned relationship between the horizontal dimension of the Region of Interest (ROI)/Pallet Analysis and the horizontal dimension of the standard goods pallet is exemplary in nature and provided only for illustrative purposes. In particular, the skilled person will acknowledge that the order checking system of the present disclosure is not limited to the above-mentioned dimensional relationship. On the contrary, the preferred embodiment is operable with any horizontal dimension associated with an entry/exit channel of an order receiving/fulfilment facility.

Referring to FIGS. 1 and 2, in an example, an entity 103 (e.g. a goods pallet hereinafter denoted using identical numeral '103') crosses the receipt/dispatch portal 101 in a left to right direction (moving from the External Monitored Zone 201 to the Internal Remaining Zone 205). The entity is deemed to have entered the First Buffer Zone 202 when two conditions are satisfied, namely:

(a) the entity is moving through the First Buffer Zone 202; and (b) a box that virtually e.g., digitally represents an outline of the entity as detected by the video sensors 102 of the order checking system 110, intersects with the Second Buffer Zone 203.

For brevity, the box virtually representing the outline of the detected entity will be referred to henceforth as a bounding box around the entity.

Figure 3:
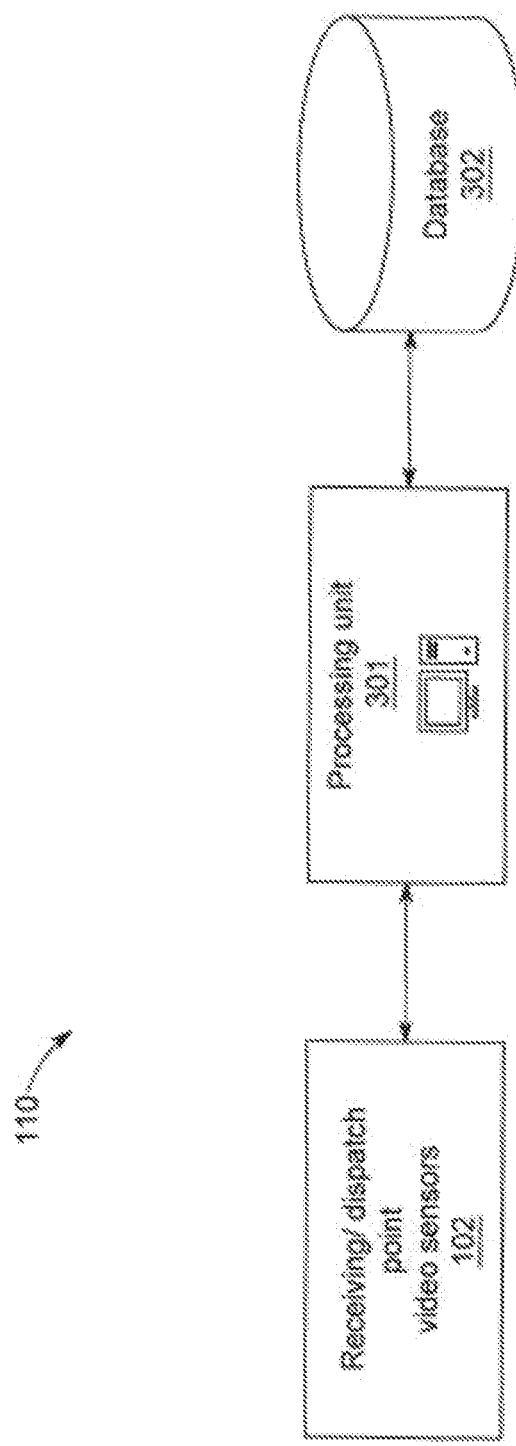
FIG. 3 is a diagrammatic overview of the order checking system, in accordance with an embodiment of the present disclosure.

Referring to FIG. 3, the architecture of the order checking system 110 of the present disclosure comprises:

(a) the receipt/dispatch portal equipped with a plurality of video sensors 102;

(b) a processing unit 301; and (c) a database 302.

If an order receiving facility/order fulfillment facility has more than one receiving/dispatch portal 101, an individual instance of the order checking system 110 may be dedicated to each receipt/dispatch portal 101. In such embodiments, some components including, inter alia, the video sensors 102, software detector components associated with the processing unit 301, and the database 302 of the order checking system 110 may be shared between individual instances of the order checking systems 110.

The processing unit 301 comprises one or more CPUs, main memory, and local storage. The processing unit 301 is configured to operate algorithms that detect the entity e.g., an object or a person in video footage captured by the video sensors 102. The processing unit 301 is also configured to operate algorithms that perform event analysis on the captured video footage. These algorithms are described later herein and are implemented by a set of software detector components that form part of the order checking system 110. The database 302 stores information necessary for realising functionalies of the algorithm implementations/detectors as described below. Specifically, in various embodiments, the information stored in the database 302 comprises the following:

a dataset of face images/logos needed for face/brand detectors; and a dataset of product images needed for product re-identification (implemented in a Merchandise Classification per Palette module described below).

The order checking system 110 of the present disclosure facilitates automatic surveillance of an order receiving area or an order dispatch area, by covering various aspects such as:

detecting from a door-opening event, an incoming delivery from a third-party supplier;

identifying the third-party supplier and implementing a check-in process for delivery persons from the third-party supplier;

correlating data, for example an Advance Shipping Notice, regarding what the supplier should be delivering with actually received products;

upon detecting an ingress/egress of merchandise through the receipt/dispatch portal, validating that the detected delivered products matches with the data regarding what the third-party supplier should be delivering; and ensuring the recordal of an outcome of the order checking process (received order approval/rejection) and a checking-out of a delivery person at the end of a delivery.

Figure 4:
FIG. 4 is a block diagram showing software architecture of the order checking system, in accordance with an embodiment of the present disclosure.

Referring to FIG. 4, the software architecture of the order checking system 110 comprises three main software modules, namely a Delivery Detection Module 402, a Pallet Monitor Module 404, and an Event (or Alert) Management module 406.

The Delivery Detection Module 402 is responsible for checking if a receiving/delivery process is undertaken correctly. The Delivery Detection Module 402 comprises a Door State Detector 402a, a Person Detector 402b, a Person Tracker 402c and a Quick Response (QR) Detector 402d. Based on an analysis of video footage captured by the video sensors 102 of the order checking system 110, the Door State Detector 402a determines if a receipt/dispatch portal 101 is in an open state or in a closed state. The Person Detector 402b analyses the video footage captured by the video sensors 102 of the order checking system 110 to detect if a delivery person has arrived at the receipt/dispatch portal 101. Using the same video footage, the Person Tracker 402c tracks the movements of the delivery person detected by the Person Detector 402b. The QR detector 402d detects the presence of a Quick Response (QR) code in the captured video footage and reads the QR code. The QR detector 402d compares the detected QR code with known pre-approved QR codes for third-party suppliers/delivery persons to find a match. In the event a match is found, a person presenting the QR code is classified (i.e., the person is deemed by the QR detector 402d) to be an authorized entrant to the order fulfillment facility/order receiving facility. Thus, in the event a detected person's movements are tracked by the Person Tracker 402c and the person is deemed to be an authorized entrant by the QR detector 402d, the Delivery Detection Module 402 grants the person access to the order fulfillment facility/order receiving facility to undertake activities pursuant to execution of the relevant delivery.

The Pallet Monitor Module 404 is dedicated to checking the contents of merchandise to be delivered from the premises or to be received into the premises i.e., the order fulfillment facility/order receiving facility. For this purpose, the first step is to detect a pallet using a Pallet Detector Module 404a, then to track the detected pallet using a Pallet Tracker Module 404b, and finally to classify the merchandise on the detected pallet using a Merchandise Classification per Pallet Module 404c. The Pallet Monitor Module 404 also comprises a Pallet Volume Estimator 404d for the purpose of estimating the quantity of merchandise on a pallet. The final component of the Pallet Monitor Module 404 is an IN/OUT counter 404e which is used to extract information about the total number of pallets passing through the receipt/dispatch portal.

The Event (or Alert) Management Module 406 comprises an Alert Manager 406a and an Event Recorder 406b. The Alert Manager 406a is configured to issue alerts concerning the detection of an authorized entrant and information about the merchandise that is being supplied/delivered e.g. merchandise class, volume of the pallet, amount of pallets received during the supply/delivery episode in question. The Event Recorder 406b is configured to record the supply/delivery episode in its entirety. The above software components will be described in more detail below.

The Person Detector 402b comprises a model used to detect in the video footage captured by the video sensors 102 of the order checking system 110, the presence of authorized entrants including, but not limited to, delivery persons from third-party suppliers and/or employees of the order fulfillment facility/order receiving facility. The outputs from the Person Detector 402b are also processed by a person re-identification model (not shown) to track persons whose presence has been detected in the captured video footage. The Door State Detector 402a comprises a model used for detecting the presence of the receipt/dispatch portal 101 in the captured video footage; and a Door State algorithm for determining whether the receipt/dispatch portal is in an open or a closed state.

In an embodiment, the Person Detector 402b and the Door State Detector 402a can be combined in a software component. In this embodiment, a neural network is used for person and door (i.e. the receipt/dispatch portal 101) detection based on the YOLOv5 architecture. The chosen architecture is version M, with an additional feature pyramid level P6 in the neck component of the original version. CSPDarknet53 (as described in C.-Y. Wang, H.-Y. M. Liao, Y-H. Wu, P.-Y. Chen, J.-W. Hsieh and I.-H. Yeh, CSPNet: A New Backbone that can Enhance Learning Capability of CNN, 2020 IEEE/CVF Conference on Computer Vision and Pattern Recognition Workshops (CVPRW), 2020, pp. 1571-1580) is the backbone of YOLOv5 used as a feature extractor. A neck is represented by PANet (as described in S. Liu, L. Qi, H. Qin, J. Shi and J Jia, Path Aggregation for Instance Segmentation, 2018 IEEE/CVF Conference on Computer Vision and Pattern Recognition (CVPR), 2018, 8759-8768) for generating feature pyramids to help the model to generalize on different scales. A head is used for the final detection by generating anchor boxes and corresponding output vectors.

However, the person skilled in the art will acknowledge that the above-mentioned neural network and architecture are exemplary in nature and provided only for illustrative purposes. In particular, the skilled person will acknowledge that the order checking system 110 of the present disclosure is not limited to the above-mentioned neural network and architecture. On the contrary, the present disclosure can be realized with any neural network and architecture capable of detecting people and objects such as doors in captured video footage. For example, the Person Detector 402b and the Door State Detector 402a could comprise a YOLOv5 architecture with an S or L architecture. Similarly, the Person Detector 402b and the Door State Detector 402a could comprise any single-shot detector (SSD) such as RetinaNet or alternatively embody other types of neural networks and architectures known to persons skilled in the art.

Further, in this embodiment, the Person Detector 402b and the Door State Detector 402a (or the combined Person and Door State Detector) are trained on a dataset for which the labels are door, employee and delivery-person. An exemplary camera setting for generation of training data and subsequent detection of persons and a door state is presented in FIG. 5. The skilled person will understand that the order checking system 110 disclosed herein is not limited to the camera positions shown in FIG. 5. In particular, cameras 501, 502 and 503 may be moved from the positions shown in FIG. 5 by 5-10 cm in any direction. Cameras 504 and 505 must be positioned so that the bottom of the receipt/dispatch portal 101 is entirely contained in the field of view of the cameras, so that a pallet can be seen in its entirety regardless of whether the pallet passes through the receipt/dispatch portal 101 on the right hand side, left hand side or centre thereof.

Video footage of a person in the training data is labelled according to the person's clothing. The labelling assumes that each operator of an order fulfillment facility or an order receiving facility has a standard uniform that must be worn by all employees; wherein the uniform is readily distinguishable from clothing worn by non-employees. The labelling protocol also addresses a degree of variation in a uniform, e.g. all employees have brown shirt, but a non-standard dark color for pants (brown, black etc.). Thus, using this approach, all people wearing the operator's uniform are labelled as "employee", and all other persons are labelled as "delivery person".

Figure 5:
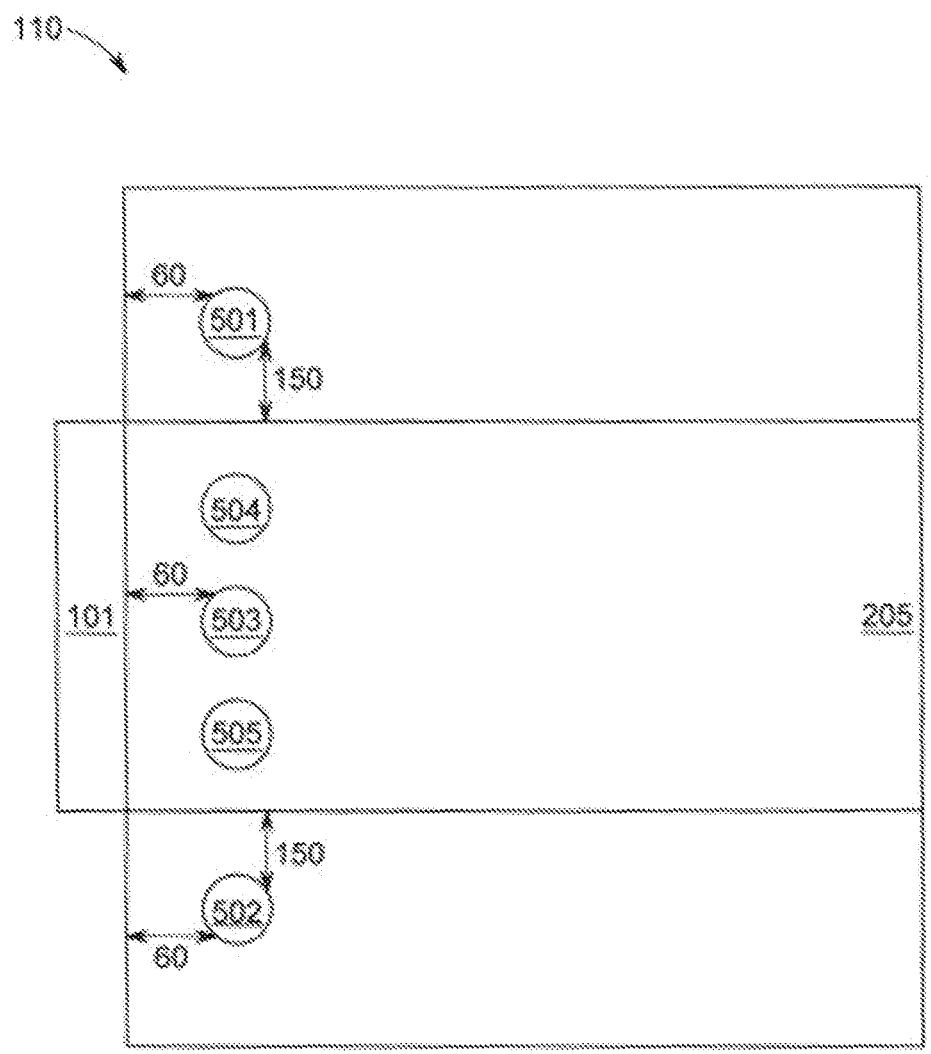
FIG. 5 is a diagrammatic illustration of an exemplary camera set-up for generation of training data and subsequent detection of persons and a door including a door state, in accordance with an embodiment of the present disclosure.

Exemplary details of the dataset used for training, validation and testing (following splitting into a training set, validation set and test set) of the order checking system 110 are as follows:
  Image sizes: a minimum of 1920×1080 pixels
  Number of annotated images: 18311
  Number of different cameras (at least 2 viewpoints as shown in FIG. 5)
  Total number of bounding boxes surrounding objects in the video frames of the dataset: 59276
  Number of bounding boxes surrounding objects of a given class in the video frames of the dataset:
    Receipt/dispatch portal: 16610
    Delivery Person: 19461
    Employee: 23205

During inference, the Person Detector 402b and the Door State Detector 402a (or the combined Person and Door State Detector) receives, as input, an image comprising a video frame from video footage captured by the video sensors 102 e.g., cameras 501-505 of the order checking system 110. In response to the received image, the Person Detector 402b (or the combined Person and Door State Detector) outputs a 3D tensor comprising the following:
  (a) the coordinates of the centre of a bounding box encompassing a person or door detected in the received image;
  (b) the width and height of the bounding box, wherein the width and height are each normalized by scaling relative to the width and height respectively of the received image;
  (c) an objectness score which denotes the confidence, valued between 0 and 1, of the neural network that an object center exists at a given location in a received image; and
  (d) two output class predictions, namely "employee" and "delivery person".

A Non-Maximum Suppression algorithm is used to generate a prediction with the best confidence score from several overlapping bounding box proposals of a same person. The term "prediction" refers to the "employee" and "delivery person" classification and the corresponding location in the received image of the person so classified.

Figure 6:
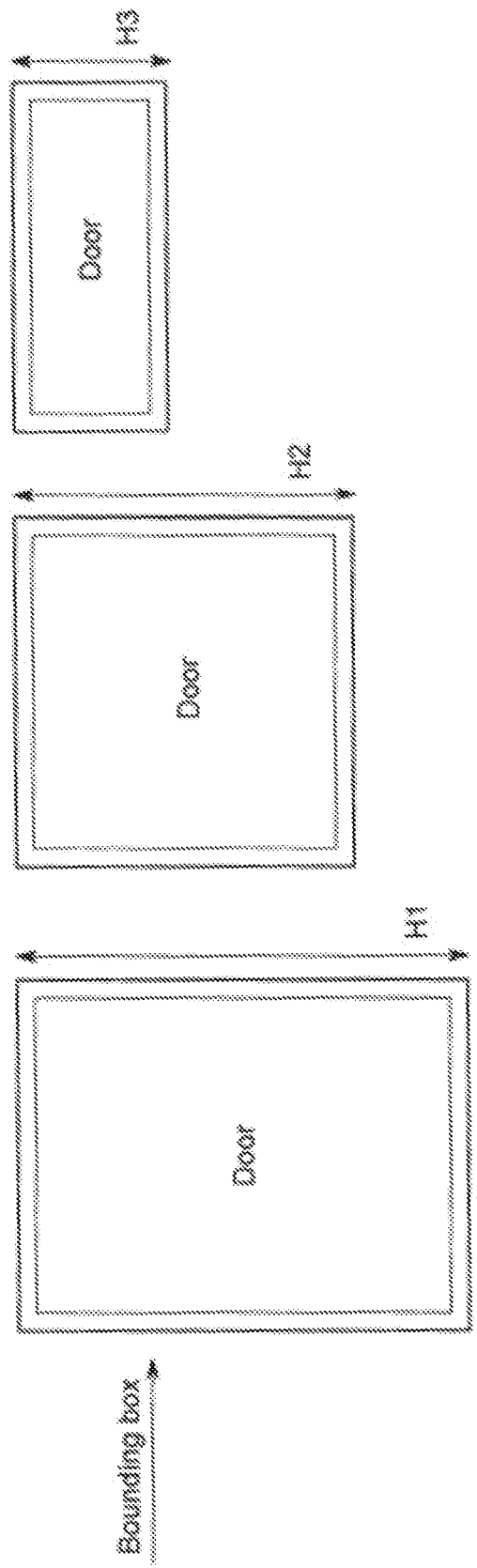
FIG. 6 illustrates detection of the receipt/dispatch portal possessing varying degrees of closedness/openness corresponding to a closed state, an intermediate state, and a completely open state, in accordance with an embodiment of the present disclosure.

In addition to detecting people, the Delivery Detection Module 402 also detects the presence of the receipt/dispatch portal 101 in a received video frame and determines whether the receipt/dispatch portal 101 is in an open state or a closed state. To this end, the YOLOv5 network of the Door State Detector 402a (or the combined Person and Door State Detector) produces an output classification of "door" on detecting the presence of the receipt/dispatch portal 101 in a received video frame. For those received video frames in which a receipt/dispatch portal 101 is detected, a further output from the YOLOv5 network is a series of coordinates from which the height of a bounding box surrounding the detected receipt/dispatch portal 101 may be calculated. Referring to FIG. 6, using the height of the bounding box, for example, H1, H2 and H3 as shown, the state of the receipt/dispatch portal 101 is determined. Specifically, the receipt/dispatch portal 101 is determined to be in either an open state or a closed state.

If the receipt/dispatch portal 101 is closed, the height of the bounding box surrounding it has a maximal value. By contrast, ideally, when the receipt/dispatch portal 101 is open, the height of the bounding box surrounding it is valued at 0, because then the receipt/dispatch portal 101 would no longer be visible in the received video frame.

Figure 7:
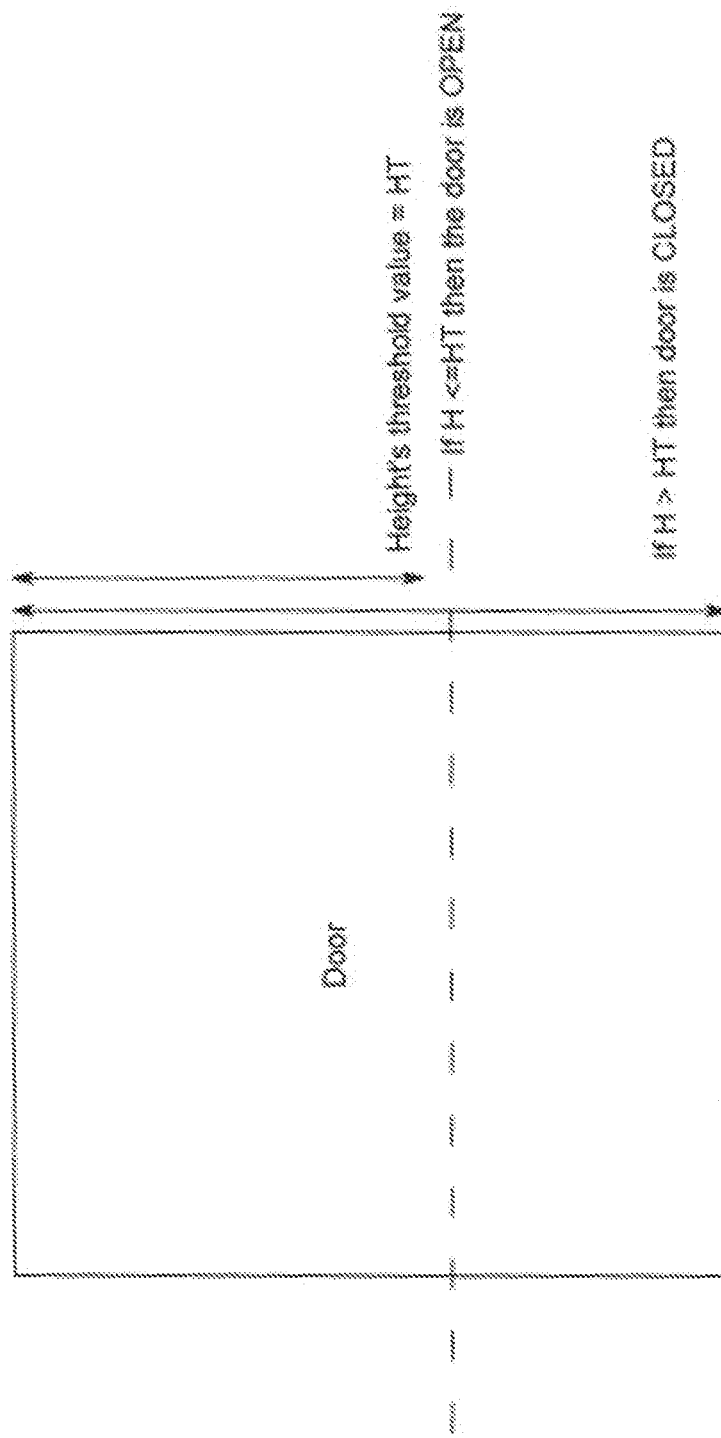
FIG. 7 illustrates an exemplary threshold for a height of a bounding box surrounding a receipt/dispatch portal that can be used to determine whether the receipt/dispatch portal is in an open or closed state, in accordance with an embodiment of the present disclosure.

However, the receipt/dispatch portal 101 may not be fully opened. In this case, to avoid classifying the receipt/dispatch portal 101 as being closed, a threshold variable may be pre-configured by an operator to a threshold value. The threshold value may be determined empirically according to the environment and arrangements under which the order checking system 110 is to be used. Referring to FIG. 7, if the height of the bounding box surrounding the receipt/dispatch portal 101 is less than or equal to the threshold value HT, the receipt/dispatch portal 101 is deemed to be open. Otherwise, if the value of the height exceeds the threshold value HT, the receipt/dispatch portal 101 is deemed to be closed. Using this approach, it will be recognized that the height H3 of the bounding box in FIG. 6 is less than or equal to the threshold value HT.

Returning to FIG. 4, the Person Tracker 402c is used to assign a track path $T_{ID}$, and unique ID for every person detected in an item of video footage; and to keep a record of that unique ID. In an embodiment, the Person Tracker 402c performs tracking by using a detection algorithm based on the DeepSort algorithm (as described in Wojke N., A. Bewley A. and Paulus D., "Simple online and realtime tracking with a deep association metric" 2017 IEEE International Conference on Image Processing (ICIP), Beijing, 2017, pp. 3645-3649). Specifically, the Person Tracker 402c uses the person detector 402b to establish bounding boxes around every person detected in every image of captured video footage. Related to these bounding boxes, unique IDs will be assigned to each detected person. The track path $T_{ID}=\{(x_1, y_1), (x_2, y_2), \ldots\}$ will represent a vector of spatial coordinates of the centers of the bounding boxes corresponding to the person ID, stored in the order that bounding boxes are established in consecutive video frames. The position is expressed in the frame coordinate system in pixels, whose origin is located in top-upper corner of the video frame; and with the OX axes horizontally disposed from left to right of the origin, and the OY axes diposed vertically from top of the video frame downwards.

Referring to FIG. 8, five people are detected in a first video frame captured at time T0; and five bounding boxes are established around the detected persons in the first video frame. The five bounding boxes are each assigned a unique ID, namely 180, 129, 159, 165 and 137. The same five people are visible, with partial occlusion of person with ID 137, in a second video frame captured shortly after the first video frame at time T1. Five bounding boxes are established around the people in the second video frame. The bounding boxes are each assigned a unique ID corresponding with that of the bounding box surrounding the same person appearing in the first video frame, even if the positions of the bounding boxes in the second video frame differ from the positions of the bounding boxes in the first video frame.

A skilled person will understand that the unique IDs shown in the video frames in FIG. 8 are provided for illustration purposes. In particular, the Person Tracker of the order checking system is in no way limited to the use of these specific unique IDs or their specific values as shown in FIG. 8. On the contrary, the Person Tracker of the order checking system is operable with any unique ID which permits the identification of individuals between successive video frames of captured video footage and a distinction to be made between an individual and other individuals appearing in the video frames.

In an embodiment, the DeepSort algorithm is used to implement tracking. A new ID is assigned to every new person entering an observed scene. For a person detected in previous video frames, the DeepSort algorithm uses a representation of the person sufficient to allow the recognition of that same person should they leave and subsequently re-enter the observed scene. On detecting and recognizing that person, the DeepSort algorithm assigns the person the same ID they were assigned when they were detected in the previous video frame(s).

The DeepSort algorithm comprises a SORT tracker and a reidentification (ReID) module which is implemented with a Views Knowledge Distillation (VKD) (Porrello A., Bergamini L. and Calderara S., "Robust Re-identification by Multiple View Knowledge Distillation, Computer Vision", ECCV 2020, Springer International Publishing, *European Conference on Computer Vision, Glasgow*, August 2020) neural network.

The original SORT tracker (as described by Bewley A, Ge Z., Ott L., Ramos F. and Uperoft B., "Simple Online and Realtime Tracking", 2016 IEEE International Conference on Image Processing (ICIP), Phoenix, AZ, 2016, pp. 3464-3468) uses only location and motion cues to track persons from one video frame to another. The original SORT tracker includes a Kalman Filter Module which receives previous tracks $T_{ID}$s and bounding boxes of persons detected in a current video frame. The Kalman Filter Module estimates a location in the current video frame of a previously detected person based on the corresponding previous track $T_{ID}$ of that person. The SORT tracker then compares the estimated location with the details of the bounding boxes surrounding each of the persons detected in a current video frame to find a closest match thereto. A measurement vector for the Kalman filter is represented by the size and location of the center of a bounding box. Additionally, a state vector of the Kalman filter contains motion information (i.e., derivatives of the measurement vector components). While simple and computationally efficient, the original SORT tracker suffers from frequent identity switches in crowded scenes. To overcome this limitation, information output from the DeepSort algorithm integrates into the SORT tracker appearance information extracted by a deep neural network, trained offline. The neural network enables ReID, i.e. re-identification of person's previously detected, but not seen for a while. The order checking system of the present disclosure uses a Views Knowledge Distillation (VKD) neural network, to generate a better representation of a person's appearance for the purpose of ReID.

The VKD neural network learns a numeric appearance descriptor of a person. The appearance descriptor is learned such that the cosine distance between appearance descriptors obtained from different poses of a same person is small, while the cosine distance between appearance descriptors of different persons is large. The VKD architecture consists of a Resnet feature extractor e.g. Resnet50 or Resnet101 and a classification head. The appearance descriptor represents the flattened output of Resnet after applying global average pooling. The VKD architecture is trained with a classification loss applied on a classification head and triplet loss applied on the appearance descriptor. VKD achieves improved performance by using a teacher network to learn a robust representation and distilling the knowledge into a student network. In the present embodiment, the representation takes the form of an embedding vector of length 2048. However, persons skilled in the art will acknowledge that the order checking system of the present disclosure is not limited to an embedding vector of this length. Instead, the order checking system disclosed herein is operable with any length of embedding vector which permits the recognition of a person within the setup and environmental conditions of a given order fulfillment facility/order receiving facility.

The DeepSort algorithm uses both motion and appearance information to assign a unique ID to a person detected in a received video frame. For brevity, a person to whom a unique ID has been assigned will be referred to henceforth as a Registered Person. To permit the tracking of a Registered Person in subsequently received video frames by matching the Registered Person with persons detected in subsequent video frames, the DeepSort algorithm retains, for a predefined number of subsequently received video frames, the ID of the Registered Person together with the appearance descriptor of the Registered Person and the corresponding location and motion information of the Registered Person contained in the corresponding Kalman filter state.

If the Registered Person is not matched with a person detected in a pre-defined number of subsequently received video frames, the unique ID and corresponding appearance and motion information of the Registered Person is discarded. In the present embodiment, the pre-defined number of subsequently received video frames is 1000. However, the skilled person will acknowledge that the order checking system of the present disclosure is not limited to this number of subsequently received video frames. Instead, the order checking system disclosed herein is operable with any number of subsequently received video frames which permits the recognition of a person who may have left the Field of View of the video sensors of the order checking system and later re-entered this Field of View, to meet the requirements of the order receipt/order delivery process and any underlying conditions of a given order fulfillment facility/order receiving facility.

The Jonker-Volgenant algorithm is used to match the estimated tracks $T_{ID}$s with the current detections of persons based on their positions. The Jonker-Volgenant algorithm is an efficient variant of the Hungarian algorithm. In a first phase, the Jonker-Volgenant algorithm is used to match previous tracks $T_{ID}$s with current detections using information about the appearance of a person. If after the first phase, there are still unmatched current detections, the algorithm is run again in a second phase using the above-mentioned motion information. After the second phase, the previous unmatched tracks are kept in a database to be used with the next received video frames; and the current unmatched detections are used to create new tracks after a certain pre-defined warm-up period, corresponding to some newly created IDs. In the present embodiment, the warm-up period is 3 video frames. However, the skilled person will recognize that the order checking system of the present disclosure is not limited thereto, rather, the number of frames used in the warm-up period may be determined empirically according to the environmental conditions and setup of the order fulfillment facility/order receiving facility.

In another embodiment, the Jonker-Volgenant algorithm matches a person detected in a current received video frame with tracks of previously detected Registered Persons based on a weighted combination of a motion cost metric and an appearance cost metric. The motion cost metric may, for example, be calculated as a squared Mahalanobis distance between a Kalman filter measurement vector associated with a person detected in a current video frame and the measurement vector predicted by the Kalman filter of each previously detected Registered Person. The appearance cost metric may, for example, be calculated as a cosine distance between the appearance descriptors of a person detected in a current video frame and the appearance descriptors of a Registered Person in each instance where the Registered Person was detected in a previously received video frame.

The person skilled in the art will acknowledge that the above-mentioned formulations for the motion cost metric and the appearance cost metric are provided for illustration purposes only. In particular, the skilled person will acknowledge that the order checking system of the present disclosure is not limited to these above-mentioned formulations for the motion cost metric and the appearance cost metric. On the contrary, the order checking system disclosed herein is operable with any formulation of the motion cost metric and the appearance cost metric which supports the matching of a person detected in a current received video frame with a previously-detected Registered Person. For example, the motion cost metric and/or the appearance cost metric may instead use a formulation comprising a maximum likelihood statistic.

Defining a Newly Registered Person as a person to whom an ID has most recently been assigned, in the event the Newly Registered Person is not matched with a person detected in a pre-defined number of subsequent video frames, the unique ID and corresponding appearance and motion information of the Newly Registered Person is discarded, as the detection leading to the Newly Registered Person is deemed a false positive detection.

SORT supports short term matching of detected persons, while ReID supports long term matching. SORT contains hyperparameters that need to be tuned on a validation dataset that contains sequences of video frames extracted from the video footage captured by the video sensors of the order checking system at a constant frame rate e.g., 4-7 frames per second. By contrast, the VKD algorithm employs a neural network trained on ReID datasets. An ReID dataset contains regions cropped from a received video frame, wherein the cropped region corresponds to the region occupied by a bounding box containing one person. The cropped regions in the ReID dataset are also sorted into tracklets each representing regions extracted from video frames belonging to the received video footage.

The neural network used in the VKD algorithm may be trained or pretrained using open-source datasets like Motion Analysis and Re-identification (MARS). The ReID dataset employed in the preferred embodiment possesses the following features:
  Image size: variable (images of pallets cropped using the bounding boxes predicted by the pallet detector)
  Number of individuals/persons: 48
  Minimum number of bounding boxes per person: 30
  Maximum number of bounding boxes per person: 3295

However, the skilled person will understand that values pertaining to the above-mentioned training/pretraining dataset and that the above-mentioned training/pretraining dataset are both provided for illustration purposes only. In particular, the skilled person will acknowledge that the order checking system of the present disclosure is not limited to training/pretraining the neural network in VKD using these datasets. On the contrary, the order checking system disclosed herein is operable with any dataset suitable for training/pretraining the neural network used in the VKD algorithm, including privately collected datasets.

Returning to FIG. 4, the QR detector 402*d* implements a quick response (QR) detection algorithm. The purpose of the QR detector 402*d* is to permit the identification of delivery persons or employees of third party suppliers/buyers etc. based on the presence of the QR code on a tag worn on the person's uniform. In this way, entry to the order fulfillment facility/order receiving facility may be controlled so that only an authorized entrant i.e., a person who presents a tag with a QR code matching a known approved QR code for suppliers/delivery persons etc. to the order fulfillment facility/order receiving facility, is allowed access to the order fulfillment facility/order receiving facility.

In one embodiment, the QR detector 402*d* is implemented using a neural network based on the Yolo_v5 architecture, and more specifically, Yolo_v5s. Yolo_v5 comprises three main parts, namely, backbone, neck, and head. The backbone employs a CSP—Cross Stage Partial Network which is used to extract features from an input image/video frame. The neck is used to generate feature pyramids. The neck comprises a PANet which helps the Yolo_v5s model to generalize on different scales. The head is used for the final detection stage, specifically, the head generates anchor boxes and the output vectors of the Yolo_v5s model. The skilled person will acknowledge that the above-mentioned network architecture is provided for illustration purposes only. In particular, the skilled person will acknowledge that the order checking system 110 of the present disclosure is not limited to the use of the above-mentioned network architecture. On the contrary, the order checking system 110 disclosed herein is operable with any suitable network architecture which enables the detection and recognition of a QR code present in an image. For example, the order checking system 110 can be operable with any other single-shot detector (SSD) such as RetinaNet disclosed earlier herein.

Exemplary details of the dataset used for training the Yolo_v5 network are as follows:
  Number of images: 1681
  Image size: 2560×1440 pixels
  Number of annotations: 1681

During training, a Reference Frame is created, wherein the Reference Frame is a video frame obtained from video footage captured of the monitored area without the presence of the QR code. In a next step, short videos are cut from raw video footage of a training dataset. The short videos contain sequences of video frames in which a QR code is shown to a video camera. To ensure diversity of feature distribution, video frames are extracted from the short videos using the average hashing algorithm. In one embodiment, the average hashing algorithm was implemented using the open-source Python library ImageHash. However, it may be noted that the above-mentioned software tool for the average hashing algorithm is provided for illustration purposes only. In particular, the skilled person will understand that the order checking system 110 of the present disclosure is not limited to the use of the ImageHash software tool. On the contrary, the order checking system 110 disclosed herein is operable with any software implementation of the average hashing algorithm.

In the average hashing algorithm, a hash is computed for each video frame in a short video. For the sake of brevity, a given one of a second or subsequent video frames in a short video will be referred to henceforth as a Candidate QR Image and a video frame preceding the Candidate QR Image in a short video will be referred to henceforth as a Preceding Candidate QR Image. In an iterative process starting from the second video frame in a short video and progressing in a stepwise manner through each remaining video frame in the short video, the hash of a Candidate QR Image is compared with the hash of Preceding Candidate QR Image and the hash of the reference frame. In the event the hash of the Candidate QR Image differs from the hash of the Preceding Candidate QR Image by a value exceeding 5, then the Candidate QR Image is selected and the hash of the Preceding Candidate QR Image is updated with the hash of the Candidate QR Image. Similarly, in the event the hash of the Candidate QR Image differs from the hash of the Reference Frame by a value exceeding 7, then the Candidate QR Image is selected and the hash of the Reference Frame is updated with the hash of the Candidate QR Image.

Once trained, the Yolo_v5 network of the above embodiment receives as input a video frame from the video footage captured by the video sensors 102 of the order checking system 110. In response, the Yolo_v5 network outputs three vectors, as follows:
  (a) the coordinates of the centre of a bounding box encompassing the QR code detected in the received image, together with the width and height of the bounding box, wherein the width and height are each normalized by scaling relative to the width and height respectively of the received video frame;
  (b) an objectness score which denotes the confidence (valued between 0 and 1), of the neural network that an object center exists at a given location in a received video frame); and
  (c) the class probabilities of the detected objects.

On detecting the QR code in a received video frame, a corresponding region is cropped from the video frame. The cropped region corresponds with a region of the video frame occupied by the bounding box surrounding the QR code combined with a further 20 pixels added on each side of the bounding box, to make sure that the whole QR code is contained in the cropped region. The QR code visible in the cropped region is then decoded using a barcode reading software component. In one embodiment, the QR code reading software component is the Python library Pyzbar, which is in turn, based on the Zbar open-source software suite. The skilled person will understand that the above-mentioned barcode reading software component is provided for illustration purposes only. In particular, the skilled person will understand that the order checking system 110 of the present disclosure is not limited to the use of the above-mentioned barcode reading software component. Instead, the order checking system 110 disclosed herein is operable with any software component capable of reading QR codes, such as, but not limited to, PyQRCode, qrcode, qrtools.

Referring to FIG. 4 in conjunction with FIG. 1, the output from the barcode reading software component comprises a string of characters decoded from the QR code detected in the received video frame. The Delivery Detection Module 402 causes the string to be associated with the person detected nearest to the QR code in the received video frame. Thus, the capability of the Person Tracker 402b to re-identify a person from one frame to another (on the basis of appearance and motion attributes) is enhanced through its coupling with an identity assigned to the person on the basis of the QR code they present to the video sensors 102 of the order checking system 110.

Figure 9:
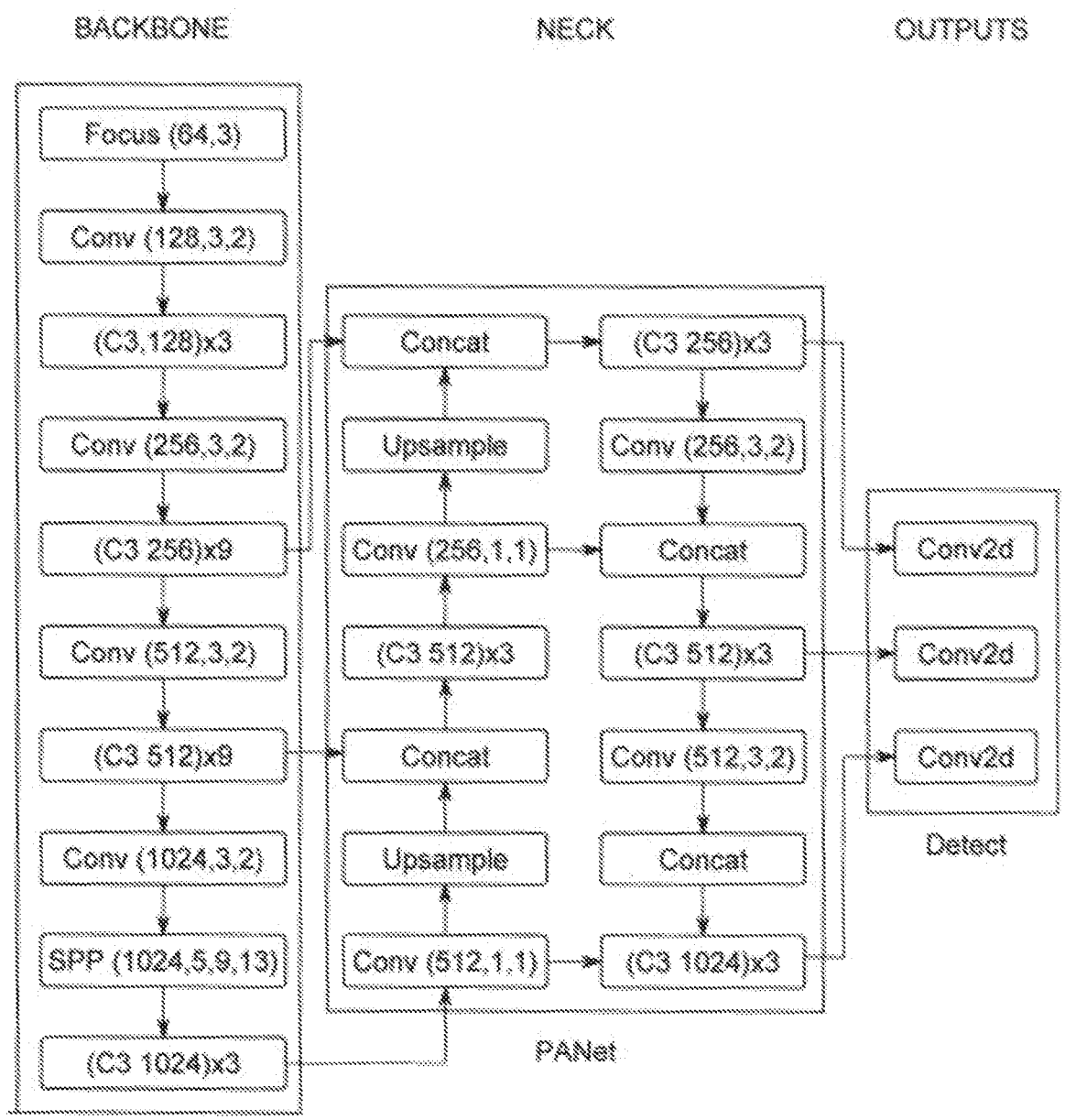
FIG. 9 illustrates an exemplary Yolo_v5 architecture that can be used to implement a pallet detector, in accordance with an embodiment of the present disclosure.

The Pallet Detector module 404a implements a model capable of detecting, determining and identifying the location of a pallet. In one embodiment, the Pallet Detector module 404a is implemented using a neural network based on the Yolo_v5 architecture, and more specifically, Yolo_v5s as depicted in FIG. 9. Moreover, as shown in FIG. 9, Yolo_v5 comprises three main parts, namely, backbone, neck, and head. The backbone employs a Cross Stage Partial (CSP) Network which is used to extract features from an input image. The neck of the Yolo_v5 neural network is used to generate feature pyramids. The neck comprises a PANet and it helps the Yolo_v5 neural network to generalize on different scales. The head is used for the final detection stage, it generates anchor boxes and the output vectors from the Yolo_v5 neural network.

The skilled person will acknowledge that the above-mentioned network architectures is provided for illustration purposes only. In particular, the skilled person will acknowledge that the order checking system of the present disclosure is not limited to the use of the above-mentioned network architecture. On the contrary, the order checking system disclosed herein is operable with any suitable network architecture which enables the detection and recognition of the QR code present in an image. For example, the order checking system disclosed herein is operable with any other single-shot detector such as RetinaNet.

Exemplary details of the dataset used to train the Yolo_v5 network are as follows:
  Image size: 1920×1080 pixels
  Number of images (containing pallets or parts of a pallet taken at different angles): 1591
  Number of bounding boxes surrounding pallets or parts thereof in the video frames of the dataset: 27873
  Number of bounding boxes per class (the dataset should be balanced, meaning that each class should have the same number of bounding boxes):

$$N = \left\lceil \frac{\text{total number of bounding boxes}}{\text{number of classes}} \right\rceil \pm 1$$

Referring to FIGS. 1, 4 and 9, once trained, the Yolo_v5 network of the the Pallet Detector module 404a, receives as input a video frame from the video footage captured by the video sensors 102 of the order checking system 110. In response, the Yolo_v5 network outputs three vectors, as follows:
  (a) the coordinates of the centre of a bounding box encompassing a pallet detected in the received image, together with the width and height of the bounding box, wherein the width and height are each normalized by scaling relative to the width and height respectively of the received video frame;
  (b) an objectness score which denotes the confidence, valued between 0 and 1, of the neural network that a pallet center exists at a given location in a received video frame; and
  (c) the class probabilities of the detected pallets.

Let a time τ be the time at which a first video frame of a given item of video footage is captured by a video camera, for example, the video camera 502 shown in FIG. 5. The time interval Δt between the capture of successive video frames of the video footage will be referred to henceforth as the sampling interval. Using this notation, the video footage can be described as $$VID \in \mathbb{R}^{nx(pxm)} = [Fr(\tau), Fr(\tau+\Delta t), Fr(\tau+2\Delta t) \ldots Fr(\tau+n\Delta t)], Fr(\tau+i\Delta t) \in \mathbb{R}^{pxm}$$

denotes an individual video frame of the video footage, the said video frame being captured at a time $\tau+i\Delta t$, which is henceforth known as the sampling time of the video frame.

For clarity, in the following disclosure, a current sampling time $t_k$ is given by $t_k = \tau + N\Delta t$, where $N < n$. A previous sampling time $t_p$ is a sampling time that precedes the current sampling time $t_k$ and is given by $t_p = D\Delta t$ where $0 < D < N$. A current video frame $Fr(t_k)$ is a video frame captured at a current sampling time $t_k$. A previous video frame $Fr(t_p)$ is a video frame captured at a previous sampling time $t_p$. Referring to FIGS. 1 and 4, a currently detected pallet is a pallet that has been detected by the Pallet Detector Module 404a in a current video frame $Fr(t_k)$. A previously detected pallet is a pallet that has been detected in a previous video frame $Fr(t_p)$. Stated differently, a previous detection of a pallet is the detection of the pallet by the Pallet Detector Module 404a in a previous video frame $Fr(t_p)$. A current detection of a pallet is the detection of the pallet by the Pallet Detector Module 404a in the current video frame $Fr(t_k)$. Further, a most recent previous detection of a pallet is a one of a one or more previous detections of a given pallet by the Pallet Detector Module 404a at a previous sampling time that is closest to the current sampling time, or in other words, at a given current time $t_k$. A most recent previous detection of a pallet is the last previous detection of the pallet in the previous video frames.

The Pallet Tracker module 404b is communicably coupled with the Pallet Detector Module 404a to receive therefrom a list of pallets detected in a current video frame. The Pallet Tracker module 404b uses the output of the Pallet Detector Module 404a to track the movement of pallets after they are detected. To this end, the Pallet Tracker module 404b tracks the center of each bounding box output from the Pallet Detector module 404a. Specifically, the Pallet Tracker module 404b processes video footage from all the video sensors 102 of the order checking system 110 to only track pallets that traverse a receipt/dispatch portal 101.

Referring to FIGS. 2 and 4, it will be noted that the area in which a pallet is tracked comprises several zones i.e., the External Monitored Zone 201, the First Buffer Zone 202, the Second Buffer Zone 203 and the Region of Interest (ROI)/Pallet Analysis Zone 204. To describe the path taken by each pallet as it moves within the area, each pallet tracked by the Pallet Tracker module 404b is assigned to a "Track". A Track has six associated attributes, namely:

(1) a unique Track identifier (Tr_ID);
(2) the life of the Track i.e., a variable that is used to count the time since a Track has last been assigned to pallet detected by the Pallet Detector module;
(3) a status variable denoting the status of the Track i.e., the status variable indicates whether the Track has been assigned to a pallet detected by the Pallet Detector module 404a; the status variable can have one of two possible values, namely "Assigned" and "Not Assigned". The default value for the status variable is "Not Assigned";
(4) the coordinates of the centre of a bounding box encompassing a pallet detected in the received video frame, together with the width and height of the bounding box, wherein the width and height are each normalized by scaling relative to the width and height respectively of the received video frame;
(5) codes of the zones depicted in FIG. 2 (referred to henceforth as zone codes) namely:
    201—External Monitored Zone
    202—First Buffer Zone
    203—Second Buffer Zone
    204—Region of Interest (ROI)/Pallet Analysis Zone
    205—Internal Remaining Zone; and
(6) a path vector $P \in \mathbb{R}^K$ comprising K path point vectors $PP \in \mathbb{R}^4$ corresponding with each of the most recent K previous observations of a same pallet. Each such path point vector in turn comprises four attributes derived from an observation of a pallet. Specifically, the attributes of a given path point comprise the following:
    the unique Track identifier (Tr_ID) of the Track with which the path vector is associated;
    the time at which the corresponding previous observation of the pallet was made; and
    the co-ordinates of the centre of the bounding box that encompassed the pallet at the corresponding previous observation thereof.

Thus, a path point vector corresponding with a previous observation of a given pallet at a time $t_p$ may be denoted by:

$$PP(t_p, ID) = \{ID, t_p, x_p, y_p\}, \text{with } p = 0, 1, \ldots, k-1.$$

The input to the Pallet Tracker module 404b is a list of currently detected pallets, wherein each element in the list has the following attributes:
the coordinates of the centre of a bounding box encompassing the currently detected pallet;
the coordinates of the corners of a bounding box encompassing the currently detected pallet;
a zone code representing the zone (201, 202, 203 or 204 in FIG. 2) in which the currently detected pallet (as described by the centre of the bounding box encompassing the currently detected pallet) was determined to be located by the Pallet Detector module 404b;
a pallet flag which indicates whether the currently detected pallet has been assigned to a Track. The default value of the pallet flag is FALSE. However, the pallet flag can be updated to "TRUE" by the Pallet Tracker module 404b on identification of a Track to which the location of the currently detected pallet is likely to belong.

Using the above nomenclature, for a current video frame $Fr(t_k)$, the Pallet Tracker module 404b uses the following method to match the currently detected pallets with a Track maintained by the Palette Tracker.

The default status of each Track from a plurality of Tracks maintained by the Pallet Tracker is set to "not assigned".

The Euclidean distances are calculated between the centre of the bounding box encompassing a currently detected pallet and the centres of the bounding boxes surrounding each of the most recently previously detected pallets whose Track status variables have a value of "not assigned". The most recent previous detection of a pallet is denoted by the last element of the path vector of the Track corresponding with the previously detected pallet in question. A currently detected pallet is assigned to a Track of a previously detected pallet for which there is a minimum Euclidean distance between the most recent previous detection of the pallet thereof and the currently detected pallet.

The pallet flag of the assigned currently detected pallet is then set to TRUE and the status variable of the Track in question is set to "assigned". Similarly, the centre of the bounding box encompassing the assigned currently detected pallet is added to the end of the path vector of the Track. Thus, the path vector of the Track is increased in size by one path point vector comprising the following attributes:

the unique Track identifier (Tr_ID) of the Track;
the current sampling time; and
the co-ordinates of the centre of the bounding box of the assigned currently detected pallet.

The above procedure of the processing step is repeated for each of the currently detected pallets until there are no remaining Tracks whose state variable is "not assigned" or no more currently detected pallets with a pallet flag set to "false" (in other words, until no potential matching pairs remains). If at the end of the process, a currently detected pallet remains that has not been assigned to a Track (i.e. a currently detected pallet remains whose pallet flag is set to "false"), a new Track is created for the currently detected pallet.

The Merchandise Classification per Pallet module 404c is configured to analyse the content of a pallet. The Merchandise Classification per Pallet module 404c comprises two communicatively coupled modules, namely an instance segmentation module and an image retrieval module. The instance segmentation module performs instance segmentation and the image retrieval module uses an image retrieval algorithm to classify cropped bounding boxes of products, that were detected by the instance segmentation module.

Because products often change their appearance from season to season or year to year, it is more scalable to have a generic model capable of detecting the presence of a product and a further model to recognize the product using prior knowledge in the form of a product database that can be easily updated instead of re-training a model for each new appearance of a class. To this end, we train the model for detecting the presence of a product and the model for recognizing the product with the following classes: "pack", "box", and "vegetables". The classes may be further extended to include "small pack", "medium pack" and "large pack". Using this formulation, the details of the dataset that may be exemplarily used for training the models of the Merchandise Classification per Pallet module 404c are as follows:

Image size:1920×1080 pixels
Number of images: 27050
Number of masks (annotations for different classes): 1114548
Number of masks per class:
  Staff: 24825
  Vendor: 10565
  Pack: 18400
  Box: 15501
  Vegetables: 101
  Flowers: 45
  Fruits: 22

Instance segmentation is employed because the products on a pallet may be stacked erratically and a pixel level mask will increase the accuracy of detecting the products. This is a benefit of multi-task training. Bounding box-based detection and mask-based detection work synergistically to achieve lower errors.

In a preferred embodiment, the instance segmentation module employs a transformer-based model inspired by Swin (as described by Z Liu, Y, Lin, Y. Cao, H. Yu, Y. Wei, Z. Zhang, S. Lin, and B. Gao, "Swin Transformer: Hierarchical Vision Transformer using Shifted Windows", Proceedings of the IEEE/CVF International Conference on Computer Vision (ICCV), 2021, pp. 10012-10022). However, the skilled person will acknowledge that the above-mentioned Swin based transformer model is provided for example purposes only. In particular, the skilled person will acknowledge that the order checking system 110 of the preferred embodiment is not limited to the use of the Swin transformer model. On the contrary, the order checking system 110 disclosed herein is operable with any transformer-based or CNN-based backbone that can be used for instance segmentation.

The image retrieval module implements an algorithm for product re-identification based on a neural network that learns an embedding for each instance of a product contained in a product image database. More specifically, the image retrieval module compares the visual appearance of a pallet in a received video frame with, visual appearance information of the products that are expected, for example based on an Advance Shipping Notice, to be received/dispatched by the order receiving facility/order fulfilment facility.

Take for example, a vendor X with product 'a', product 'b' and product 'c'. For each of these products, the above-mentioned product database comprises images expressing the current appearance of these products. From these images, information about the appearance of a product under a variety of different conditions (e.g., from different viewing perspectives and rotation angles) can be expressed as embedding vectors and these can be formed using an embedding model such as VKD or Siamese Nets. The skilled person will understand that these embedding models are provided for illustrative purposes only. In particular, the skilled person will understand that the order checking system 110 of the present disclosure is not limited to the above-mentioned embedding networks. On the contrary, the order checking system 110 disclosed herein is operable with any encoder model, capable of forming embedding vector representations of the appearance of a product, such as a classic CNN, with its head removed after being trained as a classifier. Several images (up to 10 images) of each product are provided for training the embedding model. Moreover, the VKD can be trained on an image of an entire pallet rather than images of each product. However, for this approach, a significantly larger number of images for example, at least 30 images must be provided.

The embedding vectors form a representation of a product (cola, chocolate, beer) which is robust to change of appearance and view perspective. This representation is used to identify the product in various images at different scales and positions including various rotation and tilt angles between the product and the video sensor 102. An image retrieval module of the Pallet Monitor Module 404 compares a product detected in a received video frame with products expected to be received/dispatched by retrieving images and/or embedding vectors of the relevant products from the product database. The embedding vector is used for retrieval and/or re-identification via a simple distance metric in the embedding space. In one embodiment, the distance metric is a cosine metric. However, the skilled person will acknowledge that the above distance metric is provided for illustrative purposes only. In particular, the skilled person will acknowledge that the order checking system 110 of the present disclosure is not limited to the use of a cosine distance metric in the image retrieval module. On the contrary, the order checking system 110 disclosed herein is operable with any suitable distance metric such as the Euclidean distance metric.

In the event of there being several products on a pallet, a representation of a pallet can be constructed by combining the embeddings of all the products visible on the pallet.

Using this technique, it is not only possible to determine what products appear on a pallet. Instead, it is also possible to extract information useful for estimating the number of products in a pack and the number of packs on a pallet.

A "keypoint" is defined as a point of interest on a pallet. Each keypoint corresponds to a corner of the pallet. Further, the term "pallet" refers to the entire construct of the wooden body and the products on top of the wooden body. In a preferred embodiment, there are sixteen such keypoints defined, eight for the wooden body of the pallet and eight for the products stacked on the pallet. For brevity, the wooden body of the pallet and the products stacked on the pallet will be generically referred to henceforth as pallet sub-components. Each of the above-mentioned keypoints has a different class. The name of the class comprises the pallet subcomponent name and a name composed of references to each of the 3 axis, namely far-near, left-right and top-bottom (e.g. products_far_left_top, products_far_left_bottom).

Pallets are one of the following two types:
Regular pallets: pallets which have the shape of a rectangular parallelepiped, wherein the pallet including the products stacked thereon is considered to be a single object, and the keypoints are annotated accordingly.
Irregular pallets: pallets that do not have the shape of a rectangular parallelepiped (e.g., when the shape of the stack of products is not a rectangle). In this case, the shape of the stack of products is divided into multiple rectangular parallelepipeds.

Referring to FIG. 4, in the case of irregular pallets, a Pallet keypoint detector (not shown) of the Pallet Monitor Module 404 is configured to detect multiple key points of a same class. By contrast, in the case of regular shaped pallets, the Pallet keypoint detector (not shown) detects unique keypoints (i.e., keypoints of different classes).

To this end, the Pallet keypoint detector (not shown) comprises a convolutional neural network, which is configured to receive a cropped region of a received video frame, wherein the cropped region contains a pallet. The Pallet keypoint detector (not shown) is configured to process the received cropped region to produce 16 heatmaps, each of which comprises, for example, 128×128 pixels. Each heatmap will determine the location of a corresponding keypoint in the cropped region.

Exemplary details of the dataset used for training the convolutional neural network are as follows:
Image sizes: variable as images of pallets are cropped using the bounding boxes established by the pallet detector
Number of images: 2918
Number of annotations: 30804
Number of annotations per class:
  products_far_left_top: 2712
  products_far_right_top: 2777
  products_far_right_bottom: 791
  products_near_left_top: 2700
  products_near_left_bottom: 2583
  products_near_right_top: 2781
  products_near_right_bottom: 2658
  pallet_far_right_top: 752
  pallet_far_right_bottom: 629
  pallet_near_left_top: 2543
  pallet_near_left_bottom: 2467
  pallet_near_right_top: 2640
  pallet_near_right_bottom: 2591
  pallet_far_left_top: 800
  pallet_far_left_bottom: 596
  products_far_left_bottom: 784.

Figure 10:
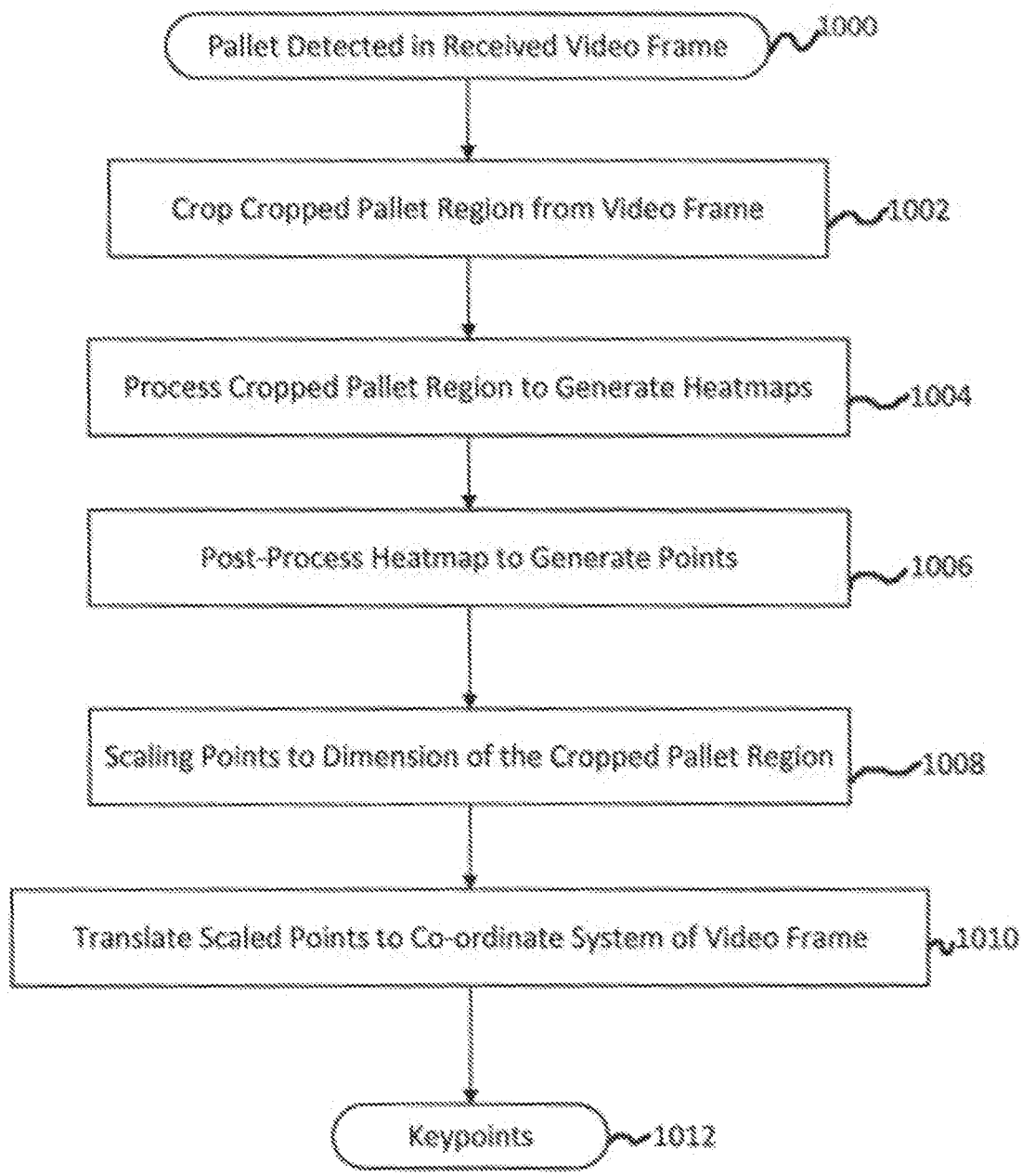
FIG. 10 illustrates a flow chart for keypoint detection, in accordance with an embodiment of the present disclosure.

Thus, referring to FIG. 10, the Pallet keypoint detector (not shown) implements the following steps:

Detecting 1000 a pallet in a received video frame. The detection of the pallet is performed by the pallet detector module, as disclosed earlier herein.

Cropping 1002 from a received video frame a region in which the presence of a pallet is detected by the pallet detector module. The cropped region corresponds with a region of the video frame occupied by a bounding box surrounding the pallet combined with a further 20 pixels added on each side of the bounding box, to make sure that the whole pallet is contained in the cropped region. For brevity, this cropped region will be referred to henceforth as a "Cropped Pallet Region". In practice, a Cropped Pallet Region comprises, for example, 128×128 pixels, with the top-left corner of the Cropped Pallet Region located at coordinates $(x_1, y_1)$ in the received video frame.

Processing 1004 sequentially, each of a one or more Cropped Pallet Regions from the received video frame, by the convolutional neural network, to generate one or more heatmaps. In one embodiment, the convolutional neural network is configured to generate 16 heatmaps from a Cropped Pallet Region. However, the skilled person will acknowledge that the above-mentioned number of heatmaps is provided for illustration purposes only. In particular, the skilled person will acknowledge that the pallet keypoint detector of the preferred embodiment is not limited to the generation of this number of heatmaps. On the contrary, the skilled person will acknowledge that the pallet keypoint detector is operable to produce any number of heatmaps from a Cropped Pallet Region as required to enable the accurate detection of the keypoints of the pallet visible in the Cropped Pallet Region.

Post-processing 1006 the plurality of heatmaps by a function to produce a list of a corresponding number of points, each of which corresponds to a pallet keypoint.

Scaling 1008 the points to the dimensions of the Cropped Pallet Region. Thus, if, for example, the Cropped Pallet Region is of dimension 128×128 and a point is defined by (x, y)=(0.46, 0.76), then the point is located at approximately (x', y')=(59, 97) in the coordinate system of the Cropped Pallet Region whose top left corner is denoted by (0, 0).

Translating 1010 the scaled points back to the coordinate system of the received video frame, wherein the results of the translation are the keypoints 1012 of the detected pallet.

Returning to FIG. 4, a Pallet Volumetric Estimation algorithm of the Pallet Volume Estimator 404d computes the volume of objects by estimating their size from a 2D image. In general, recovering 3D positions from 2D projections is not possible, since an infinite number of points from a line in the 3D space are projected on the same point on the 2D projection i.e., camera plane. One possible solution to solve the ambiguity, which is exploited in stereo vision, is to use a pair of views of the scene, captured from different positions and using the triangulation principle, to recover depth information.

Figure 11A:
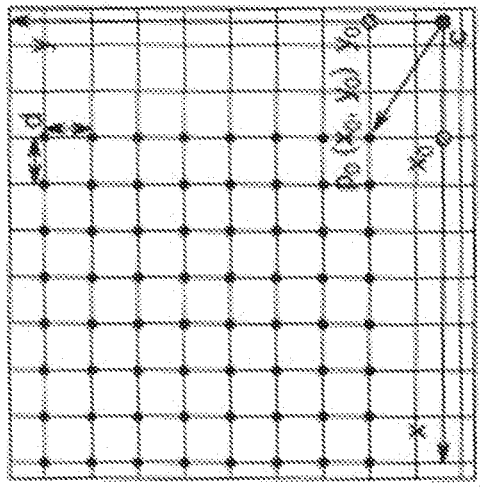
FIG. 11(*a*) is a virtual representation of a physical grid pattern marked on a ground area, in accordance with an embodiment of the present disclosure.
Figure 11B:
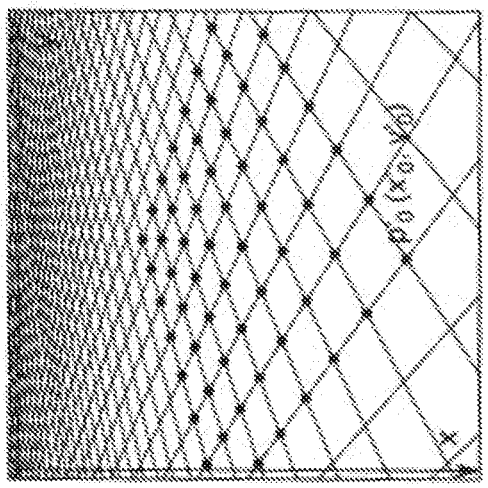
Figure 12A:
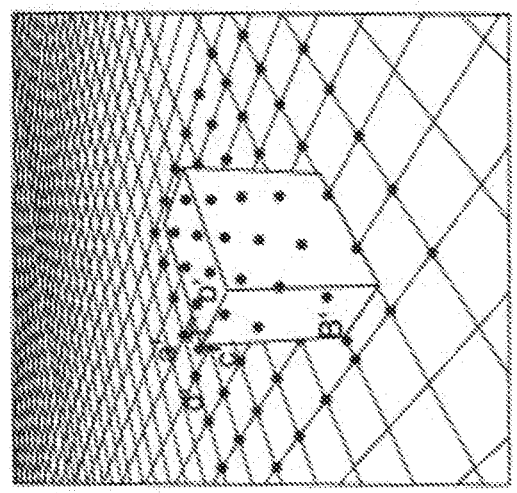
FIG. 12(*a*) illustrates an exemplary cuboid with opposing corner points T' and B', in accordance with an embodiment of the present disclosure.
Figure 12B:
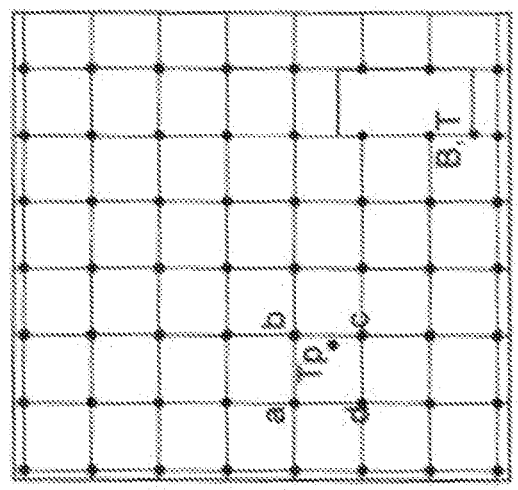

The preferred embodiment assumes a flat and horizontal floor; and uses a homography to compute the real-world coordinates of floor points from camera coordinates. FIG. 11(a) shows physical grid pattern points marked on the ground; FIG. 11(b) shows a representation of these points on a camera projection. For brevity, these grid pattern points will be referred to henceforth as a Reference Grid. Using the correspondence of projections on the floor for corner points belonging to the same vertical line (e.g., top-left corner T' of the front side of a rectangular cuboid corresponds to the bottom-left corner B' of the same side as depicted in FIG.

12(a)) and basic geometry, the elevation of parallelepiped corners from the ground are calculated. From these, the volume of the object is calculated.

The first step of the algorithm is to estimate the parameters of the homographic transformation mapping points (x', y') from the floor to camera pixel coordinates (x, y):

$$\begin{pmatrix} x \\ y \\ 1 \end{pmatrix} = H \begin{pmatrix} x' \\ y' \\ 1 \end{pmatrix} = \begin{pmatrix} h_{00} & h_{01} & h_{02} \\ h_{10} & h_{11} & h_{12} \\ h_{20} & h_{21} & h_{22} \end{pmatrix} \begin{pmatrix} x' \\ y' \\ 1 \end{pmatrix} \quad (1)$$

Since not all parameters are independent, the homography matrix is estimated up to a scale. To this end, the matrix is normalized. For example, in equation (1), $h_{22}$ can be set to a value of 1, so that the remaining 8 parameters of the H matrix can be recovered from a set of 4 correspondent points with known positions, taken from the known Reference Grid. For better accuracy, more correspondent points with known positions are used.

Returning to FIG. 11, a Reference Grid is built with marked points on the floor, and the homograpy is estimated for several sets of four points. The Least Median of Squares robust estimation method is then used to find the solution parameters. In a possible embodiment, the spacing between individual points of the grid (i.e., the grid size parameter d) is set to 50 cm.

In many instances, a pallet may be represented by a rectangular cuboid object. The volume of a rectangular cuboid object can be computed using the sizes (in pixels) of its edges. This is computed from the key points representing the corners of the pallet. In particular, the width and the length of the pallet are the sizes of two abutting edges sitting on the floor. Thus, defining the bottom edge of a parallelepiped as the edge thereof which sits on the floor, the length of the bottom edge may be computed from the corners of the pallet corresponding to the parallelepiped. To this end, the location of the corners of the pallet are estimated by reference to the points from the ground pattern of FIG. 11(a) observed to be closest to the corners. From this, the length of the bottom edge of the corresponding parallelepiped is computed using equation (1) above.

The height of a rectangular cuboid object may be computed as the distance between one corner sitting on the floor, and an opposing corner located directly above it. For example, referring to FIG. 13, since T is located above B, the projection $T_p$ is collinear with B and $C_p$. A camera C observing the pallet corresponding with the parallelepiped is disposed at a known height $C_{height}$ from the floor. The height $C_{height}$ is the length $|CC_p|$ in FIG. 13. TB and $CC_p$ also represent heights. Thus, $\overline{TB}$ and $\overline{CC_p}$ are perpendicular to the floor plane and are aligned in parallel. Accordingly, equation (2) can be established from the similarity between the triangle $T_pC_pC$ and the triangle $T_pBT$ triangle, $$\frac{\overline{CC_p}}{TB} = \frac{\overline{T_pC_p}}{T_pB} => \overline{TB} = \frac{\overline{CC_pT_pB}}{T_pC_p} \quad (2)$$

Sometimes a pallet can present a different shape than a rectangular cuboid. Two common cases are when: (a) the number of items on different pallet rows differ from each other; and (b) when a pallet is configured with a non-homogeneous set of packs of different items, each of them exposing a rectangular cuboid shape.

Figure 14:
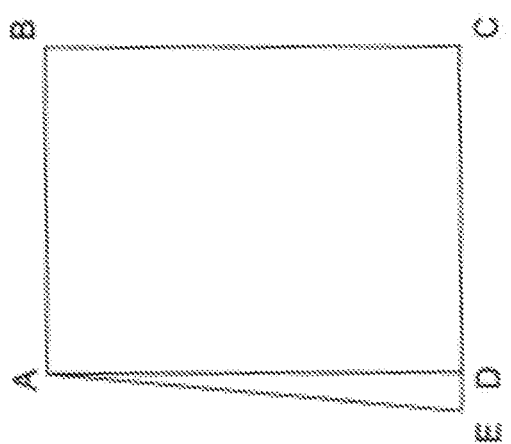
FIG. 14 is a transverse cross-sectional view of a pallet.

For objects of different shapes (e.g., case (a) disclosed above), additional key points are needed for volumetric computation, because the method described above can only accurately determine points corresponding to lines perpendicular to the floor (which represent heights), as they are parallel to the line CCp in FIG. 13. For example, in FIG. 14, point D located below point A is needed for the estimation of the location of point A. Otherwise, if |EA| is the inclined height of the object shown in FIG. 14, the area of the surface ABCE would be incorrectly estimated. Specifically, point A would be estimated to be higher above the floor than it is, since EA is not parallel to CCp in FIG. 13 and the pixel distance between points A and E is greater than that between points A and D. To estimate the area of the surface ABCE with precision, we need to separately compute the areas of ABCD and ADE.

Figure 15:
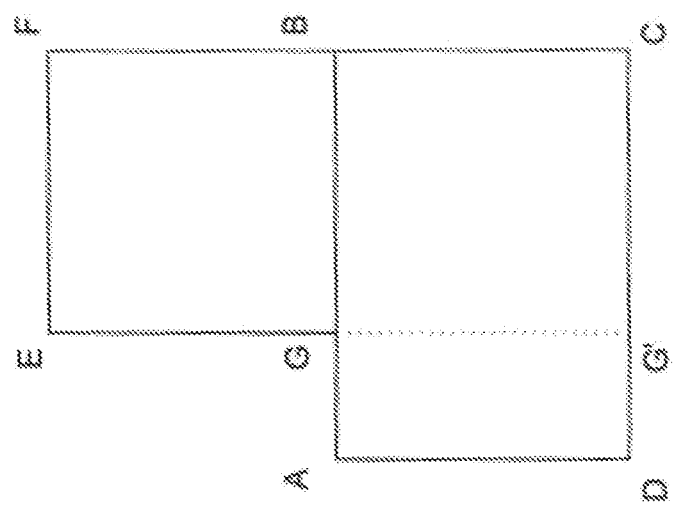
FIG. 15 is a transverse cross-sectional view of a pallet on which two boxes are stacked and where the bottom box is longer than the top box.

FIG. 15 shows a different pallet shape which is representative of case (b) disclosed above, wherein a pallet is configured with a non-homogeneous set of packs of different items. In this case, the pallet shape is formed of two rectangular objects stacked on top of each other. Point G can only be computed using the method described above if the point G' below it is known (given as a key point). Similarly, the point E can be estimated since EG' is perpendicular to the floor.

Thus, in each received video frame, key points representing the corners of a pallet visible therein are detected by the pallet keypoint detector (not shown), as well as other useful points (e.g., G' as shown in FIG. 15). Returning to FIG. 4, the Pallet Volumetric Estimation algorithm (not shown) of the Pallet Volume Estimator 404d is configured to use the above approaches to compute the volumes of the pallets in each of the video frames, if enough key points (pallet corners) are visible and detected, regardless of the angle of the pallet relative to the camera observing it.

Referring to FIG. 4 together with FIG. 1, the IN-OUT counter 404e is configured to use the path determined by the Pallet Tracker module 404b and defined as a sequence of the form:

$$P(t_k|ID) = \{ID, t_k, x_k, y_k\}, \text{with } k=0,1,\ldots,K$$

to detect which path intersects with the receipt/dispatch portal 101; and thereby determine which pallet enters/exits the order fulfillment facility/order receiving facility. Using this information, the order checking system 110 records incoming and outgoing pallets (identified by their IDs) along with the times of their entry/exit. Furthermore, a count may be retained of the number of incoming/outgoing pallets to/from the order fulfillment facility/order receiving facility (as determined by the direction of movement of the pallets) over a given period.

In addition, the value of a pallet state variable may be recorded for a pallet. A pallet state variable characterizes the extent to which a pallet is loaded. For example, the value of a pallet state variable could be "fully loaded", "empty", "partly loaded" etc. The value of the pallet state variable can be determined using the height of the goods stacked on the pallet determined by the Pallet Volumetric Estimator 404d. Knowing the maximum allowable stacking height on a pallet, a pallet may be classified as being:

fully loaded if the height of the goods stacked thereon is close to a maximum allowable stacking height; or partly loaded if the height of the goods stacked thereon is approximately half of the maximum allowable stacking height; or empty if there are no products on the pallet.

The Event (or Alert) Management module 406 triggers certain alerts based on events of interest, specific to individual applications (e.g., exceeding maximum open time for a door, invalid access to a receipt/dispatch portal etc.). The events are generated using the outputs from, for example, the Door State Detector 402a, the Person Detector 402b and the QR Detector 402d. The events of interest are also recorded as GIF files and stored on a disk for later use.

The Event (or Alert) Management module 406 implements the logic for certain alerts, such as, but not limited to:
Receipt/dispatch portal 101 is left open for a period longer than a certain threshold;
Pallet remains in a certain area for a period longer than a certain threshold;
Pallet contents from a certain vendor do not match the Advance Shipment Notice;
Pallets exiting the receipt/dispatch portal 101 without being registered in the order checking system 100;
Pallet height exceeds a certain maximum allowed height;
Employee of the order fulfilment facility/order receiving facility is not present when a delivery person arrives; and
Delivery person enters the Order fulfilment facility/order receiving facility without signing in.

These, and other types of, alerts are based on the outputs from, for example, the Door State Detector 402a, the Person Detector 402b and the QR Detector 402d. For example, when the receipt/dispatch portal 101 is opened, a timer is started and, if that timer reaches a certain threshold, an alert is triggered and an event is recorded.

When an alert is triggered, the Event Recorder 406b is configured to save a set of consecutive video frames on a disk (wherein the consecutive video frames may also be assembled and packed as an animated GIF file), starting at a certain time period before an alert and ending a certain time period after the alert (e.g., wherein the time periods may extend from 10 to 60 seconds, based on the type of alert). The resulting video frames/GIFs are saved, to be checked by the staff at any time. The maximum number of stored video frames/GIFs and the duration for which they are retained may be configured according to the needs of the operator and will be handled by a logic of the Event Recorder 406b that is pre-defined based on application specific requirements.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An order checking system comprising:
a plurality of video sensors configured to capture video footage of a monitored area located within an order receiving area or an order dispatch area of a receipt/dispatch portal;
a processing unit configured to:
perform event analysis on the captured video footage;
detect an entity in the video footage captured by the video sensors;
detect from a door opening event in the captured video footage, an incoming delivery from a third-party supplier;
identify the third-party supplier and implement a check-in process for delivery persons from the third-party supplier;
detect an ingress/egress of merchandise through the receipt/dispatch portal and validate that detected delivered products matches with data regarding products that the third-party supplier should be delivering;
analyse the video footage captured by the video sensors to determine if the receipt/dispatch portal is in an open state or a closed state using a Door State Detector;
analyse the video footage captured by the video sensors to detect if a delivery person has arrived at the receipt/dispatch portal using a Person Detector;
track movements of the delivery person from the captured video footage upon detection of the delivery person by the Person Detector using a Person Tracker;
detect a presence of a quick response (QR) code in the captured video footage and to read the QR code using a quick response (QR) Detector,
wherein the QR detector compares the detected QR code with known pre-approved QR codes for third-party suppliers/delivery persons to find a match, and
wherein if a match is found, the QR detector is configured to:
classify the delivery person presenting the QR code as an authorized entrant to an order fulfillment facility/order receiving facility; and
grant the delivery person access to the order fulfillment facility/order receiving facility; and
check one or more contents of merchandise to be delivered from, or received into, a premises of the order fulfillment facility/order receiving facility using a Pallet Monitor Module, wherein the Pallet Monitor Module comprises:
a Pallet Detector Module configured to detect a pallet;
a Pallet Tracker Module configured to track the detected pallet;
a Merchandise Classification per Pallet Module configured to classify merchandise on the detected pallet;
a Pallet Volume Estimator configured to estimate a quantity of merchandise on the detected pallet; and
an IN-OUT counter configured to extract information about a total number of pallets passing through the receipt/dispatch portal; and
a database communicably coupled to the processing unit, the database configured to store:
at least a dataset of face images/logos for use in detecting faces/brands;
a dataset of product images for use in identification of products; and
record an outcome of an order checking process and a check out of a delivery person at an end of a delivery for future retrieval upon request to the processing unit.

2. The order checking system of claim 1, wherein the Person Detector and the Door State Detector is embodied as a neural network of a pre-determined architecture that is configured for person and door detection.

3. The order checking system of claim 1, wherein the processing unit further comprises an Event Management module in communication with the Delivery Detection Module and the Pallet Monitor Module, the Event Management module comprising:
an Alert Manager configured to issue alerts concerning the detection of an authorized entrant and information about the merchandise that is being supplied/delivered during a supply/delivery episode; and
an Event Recorder configured to record the supply/delivery episode.

4. The order checking system of claim 3, wherein the Alert Manager is further configured to issue alerts when:
the receipt/dispatch portal is left open for a period exceeding a first pre-defined threshold;
the pallet remains in a certain area for a period exceeding a second pre-defined threshold;
the contents of the pallet from a certain third-party supplier do not match corresponding particulars of an advance shipment notice;
the pallet exits the receipt/dispatch portal without being pre-registered;
a height of the pallet exceeds a pre-defined maximum allowed height;
an employee of the order fulfillment facility/order receiving facility is not present on arrival of the delivery person; and
the delivery person enters the order fulfillment facility/order receiving facility without previously signing in.

5. A method for performing video surveillance, the method comprising:
capturing video footage, using a plurality of video sensors, of a monitored area located within an order receiving area or an order dispatch area of a receipt/dispatch portal;
performing, using a processing unit, event analysis on the captured video footage;
detecting, using the processing unit, an entity in the video footage captured by the video sensors;
detecting from a door opening event in the captured video footage, an incoming delivery from a third-party supplier using the processing unit;
identifying, using the processing unit, the third-party supplier and implementing a check-in process for delivery persons from the third-party supplier;
detecting, using the processing unit, an ingress/egress of merchandise through the receipt/dispatch portal and validating that detected delivered products matches with data regarding products that the third-party supplier should be delivering;
analysing the video footage captured by the video sensors to determine whether the receipt/dispatch portal is in an open state or a closed state;
analysing the video footage captured by the video sensors of the order checking system to detect whether a delivery person has arrived at the receipt/dispatch portal;
tracking movements of the delivery person from the captured video footage upon their detection;
detecting a presence of a quick response (QR) code in the captured video footage; and
reading the detected QR code as output;
comparing the detected QR code with known pre-approved QR codes for third-party suppliers/delivery persons to find a match, and wherein in the event a match is found:
classifying a delivery person presenting the QR code as an authorized entrant to an order fulfillment facility/order receiving facility; and
granting the delivery person access to the order fulfillment facility/order receiving facility;
checking one or more contents of merchandise to be delivered from, or received into, a premises of the order fulfillment facility/order receiving facility, wherein the step of checking comprises:
detecting a pallet using a Pallet Detector Module;
tracking the detected pallet using a Pallet Tracker Module;
classifying merchandise on the detected pallet using a Merchandise Classification per Pallet Module;
estimating a quantity of merchandise on the detected pallet using a Pallet Volume Estimator; and
extracting information about a total number of pallets passing through the receipt/dispatch portal using an IN-OUT counter;
storing, using a database, at least a dataset of face images/logos for use in detecting faces/brands and a dataset of product images for use in identification of products;
recording an outcome, using the database of an order checking process and a check out of a delivery person at an end of a delivery; and
retrieving the recording, by the processing unit from the database, upon request to the processing unit.

6. The method of claim 5, further comprising implementing a neural network of a pre-determined architecture configured for person and door detection.

7. The method of claim 5, further comprising:
issuing an alert concerning a detection of an authorized entrant and information about the merchandise that is being supplied/delivered during a supply/delivery episode using an Alert Manager; and
recording the supply/delivery episode using an Event Recorder.

8. The method of claim 7, further comprising issuing alerts by the alert manager in the event:
the receipt/dispatch portal is left open for a period exceeding a first pre-defined threshold;
the pallet remains in a certain area for a period exceeding a second pre-defined threshold;
the contents of the pallet from a certain third-party supplier do not match the corresponding particulars of an advance shipment notice;
the pallet exits the receipt/dispatch portal without being pre-registered;
a height of the pallet exceeds a pre-defined maximum allowed height;
an employee of the order fulfillment facility/order receiving facility is not present on arrival of the delivery person; and
the delivery person enters the order fulfillment facility/order receiving facility without previously signing in.

9. A non-transitory computer readable medium having stored thereon computer-executable instructions which, when executed by a processing unit, causes the processing unit to:
capture video footage, using a plurality of video sensors, of a monitored area located within an order receiving area or an order dispatch area of a receipt/dispatch portal;
perform event analysis on the captured video footage;
detect an entity in the video footage captured by the video sensors;
detect, from a door opening event in the captured video footage, an incoming delivery from a third-party supplier using the processing unit;

identify the third-party supplier and implementing a check-in process for delivery persons from the third-party supplier;
detect an ingress/egress of merchandise through the receipt/dispatch portal and validating that detected delivered products matches with data regarding products that the third-party supplier should be delivering;
analyse the video footage captured by the video sensors of the order checking system to determine whether the receipt/dispatch portal is in an open state or a closed state;
analyse the video footage captured by the video sensors to detect whether a delivery person has arrived at the receipt/dispatch portal;
track movements of the delivery person from the captured video footage upon their detection;
detect a presence of a quick response (QR) code in the captured video footage and read the detected QR code as output;
compare the detected QR code with known pre-approved QR codes for third-party suppliers/delivery persons to find a match, and wherein in the event a match is found:
  classify a delivery person presenting the QR code as an authorized entrant to an order fulfillment facility/order receiving facility; and
  grant the delivery person access to the order fulfillment facility/order receiving facility;
check one or more contents of merchandise to be delivered from, or received into, a premises of the order fulfillment facility/order receiving facility, wherein the step of checking comprises:
  detecting a pallet using a Pallet Detector Module;
  tracking the detected pallet using a Pallet Tracker Module;
  classifying merchandise on the detected pallet using a Merchandise Classification per Pallet Module;
  estimating a quantity of merchandise on the detected pallet using a Pallet Volume Estimator; and
  extracting information about a total number of pallets passing through the receipt/dispatch portal using an IN-OUT counter;
store, using a database, at least a dataset of face images/logos for use in detecting faces/brands and a dataset of product images for use in identification of products; and
record, using the database, an outcome of an order checking process and a check out of a delivery person at an end of a delivery; and
retrieve the recording from the database upon request by the processing unit.

10. The non-transitory computer readable medium of claim 9, wherein upon execution of the executable instructions, the processing unit is configured to:
  issue an alert concerning a detection of an authorized entrant and information about the merchandise that is being supplied/delivered during a supply/delivery episode using an Alert Manager; and
  record the supply/delivery episode using an Event Recorder.

11. The non-transitory computer readable medium of claim 9, wherein upon execution of the executable instructions, the processing unit is configured to issue alerts using the alert manager in the event:
  the receipt/dispatch portal is left open for a period exceeding a first pre-defined threshold;
  the pallet remains in a certain area for a period exceeding a second pre-defined threshold;
  the contents of a pallet from a certain third-party supplier do not match corresponding particulars of an advance shipment notice;
  the pallet exits the receipt/dispatch portal without being pre-registered;
  a height of the pallet exceeds a pre-defined maximum allowed height;
  an employee of the order fulfillment facility/order receiving facility is not present on arrival of the delivery person arrives; and
  the delivery person enters the order fulfillment facility/order receiving facility without previously signing in.

* * * * *